United States Patent
Choi et al.

(10) Patent No.: US 11,198,110 B2
(45) Date of Patent: Dec. 14, 2021

(54) METHOD OF FABRICATING ORGANIC STRUCTURE DIRECTING AGENT-FREE CHA TYPE ZEOLITE MEMBRANE AND MEMBRANE FABRICATED THEREBY

(71) Applicant: Korea University Research and Business Foundation, Seoul (KR)

(72) Inventors: Jungkyu Choi, Seoul (KR); Kwan-Young Lee, Seoul (KR); Eunhee Jang, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 172 days.

(21) Appl. No.: 16/050,207

(22) Filed: Jul. 31, 2018

(65) Prior Publication Data

US 2019/0143296 A1 May 16, 2019

(30) Foreign Application Priority Data

Nov. 16, 2017 (KR) .................. 10-2017-0153218

(51) Int. Cl.
*B01J 20/18* (2006.01)
*C01B 39/46* (2006.01)
(Continued)

(52) U.S. Cl.
CPC .............. *B01J 20/18* (2013.01); *B01D 53/04* (2013.01); *B01D 53/228* (2013.01);
(Continued)

(58) Field of Classification Search
CPC ........ B01J 20/18; B01D 53/04; B01D 53/228; B01D 67/0051; B01D 71/028
See application file for complete search history.

(56) References Cited

U.S. PATENT DOCUMENTS

| 3,723,561 A | 3/1973 | Priegnitz |
| 4,544,538 A | 10/1985 | Zones |

(Continued)

FOREIGN PATENT DOCUMENTS

| JP | 2011016123 A | 1/2011 |
| JP | 5783527 B2 | 9/2015 |

(Continued)

OTHER PUBLICATIONS

J. Caro et al., "Zeolite membranes—state of their development and perspective," Microporous and Mesoporous Materials; vol. 38 (2000) pp. 3-24.

(Continued)

*Primary Examiner* — Krishnan S Menon
(74) *Attorney, Agent, or Firm* — Sughrue Mion, PLLC

(57) ABSTRACT

The present invention relates to a method of fabricating an organic structure directing agent-free CHA type zeolite membrane and a membrane fabricated thereby, and more particularly to a method of fabricating a continuous CHA type zeolite membrane, which exhibits $CO_2/N_2$ and $CO_2/CH_4$ separation performances comparable with those of conventional membranes, in a cost-effective manner without a calcination process by hydrothermal synthesis using an alkali metal hydroxide without using an organic structure directing agent, and to a membrane fabricated thereby.

5 Claims, 17 Drawing Sheets

(51) Int. Cl.
  *B01J 20/28* (2006.01)
  *B01J 20/30* (2006.01)
  *B01D 53/04* (2006.01)
  *B01D 71/02* (2006.01)
  *B01D 53/22* (2006.01)
  *B01D 67/00* (2006.01)

(52) U.S. Cl.
  CPC ....... *B01D 67/0051* (2013.01); *B01D 71/028* (2013.01); *B01J 20/28033* (2013.01); *B01J 20/3085* (2013.01); *C01B 39/46* (2013.01); *B01D 2253/1085* (2013.01); *B01D 2256/10* (2013.01); *B01D 2256/245* (2013.01); *B01D 2257/504* (2013.01); *B01D 2323/08* (2013.01); *B01D 2323/12* (2013.01)

(56) References Cited

U.S. PATENT DOCUMENTS

| | | |
|---|---|---|
| 2014/0315709 A1 | 10/2014 | Choi et al. |
| 2017/0036175 A1* | 2/2017 | Tanabe ................. B01D 53/228 |
| 2017/0259214 A1* | 9/2017 | Onozuka ................. C01B 39/46 |

FOREIGN PATENT DOCUMENTS

| | | |
|---|---|---|
| JP | 2017-131887 A | 8/2017 |
| JP | 2017-521347 A | 8/2017 |
| JP | 2017-170444 A | 9/2017 |
| JP | 2017-200866 A | 11/2017 |
| KR | 1020160062446 A | 6/2016 |
| WO | 2016/041596 A1 | 3/2016 |
| WO | 2017/142056 A1 | 8/2017 |

OTHER PUBLICATIONS

Zhiping Lai et al., "Microstructural Optimization of a Zeolite Membrane for Organic Vapor Separation," Science; vol. 300 (Apr. 18, 2003) pp. 456-460.
Hartwig Voβ et al., "Butene isomers separation on titania supported MFI membranes at conditions relevant for practice," Journal of Membrane Science; vol. 329 (2009) pp. 11-17.
Weiguo Sun et al., "Pervaporation separation of acetic acid-water mixtures through Sn-substituted ZSM-5 zeolite membranes," Journal of Membrane Science; vol. 335 (2009) pp. 83-88.
G. Li et al., "Separation of water-acetic acid mixtures by pervaporation using a thin mordenite membrane," Separation and Purification Technology; vol. 32 (2003) pp. 199-206.
Mark A. Snyder et al., "Hierarchical Nanomanufacturing: From Shaped Zeolite Nanoparticles to High-Performance Separation Membranes," Angewandte Chemie; Reviews; vol. 46 (2007) pp. 7560-7573.
J. van den Bergh et al., "Separation and permeation characteristics of a DD3R zeolite membrane," Journal of Membrane Science; vol. 316 (2008) pp. 35-45.
G.T. Kokotailo et al., "Structure of synthetic zeolite ZSM-5," Nature; vol. 272 (Mar. 30, 1978) pp. 437-438.
Eunjoo Kim et al., "An oriented, siliceous deca-dodecasil 3R (DDR) zeolite film for effective carbon capture: insight into its hydrophobic effect," Journal of Materials Chemistry A; Royal Society of Chemistry; vol. 5 (2017) p. 11246-11254.
Halil Kalipcilar et al., "Synthesis and Separation Performance of SSZ-13 Zeolite Membranes on Tubular Supports," Chem. Mater.; vol. 14 (2002) pp. 3458-3464.
J. Hedlund et al., "ZSM-5 membranes synthesized without organic templates using a seeding technique," Journal of Membrane Science; vol. 159 (1999) pp. 263-273.
Yanfeng Zhang et al., "Template removal from SAPO-34 crystals and membranes," Journal of Membrane Science; vol. 363 (2010) pp. 29-35.
Shiguang Li et al., "SAPO-34 membranes for $CO_2/CH_4$ separation," Journal of Membrane Science vol. 241 (2004) 121-135.
Suraj Gopalakrishnan et al., "Permeation properties of templated and template-free ZSM-5 membranes," Journal of Membrane Science; vol. 274 (2006) pp. 102-107.
Re Lai et al., "ZSM-5 membrane synthesis with organic-free mixtures," Microporous and Mesoporous Materials; vol. 38 (2000) pp. 239-245.
Y. Hasegawa et al., "Preparation of novel chabazite (CHA)-type zeolite layer on porous $\alpha$-$Al_2O_3$ tube using template-free solution," Journal of Membrane Science; vol. 347 (2010) pp. 193-196.
Hiroyuki Imai et al., "Direct crystallization of CHA-type zeolite from amorphous aluminosilicate gel by seed-assisted method in the absence of organic-structure-directing agents," Microporous and Mesoporpous Materials; vol. 196 (2014) pp. 341-348.
Xiansen Li et al., "Influence of the hydrothermal synthetic parameters on the pervaporative separation performances of CHA-type zeolite membranes," Microporous and Mesoporous Materials; vol. 143 (2011) pp. 270-276.
N. Rangnekar et al., "Zeolite membranes—a review and comparison with MOFs," Chem. Soc. Rev.; Royal Society of Chemistry; vol. 44 (2015) pp. 7128-7154.
M. Pan et al., "Template-free secondary growth synthesis growth synthesis of MFI type zeolite membranes," Microporous and Mesoporous Materials; vol. 43 (2001) pp. 319-327.
Na Young Kang et al., "The effect of $Na_2SO_4$ salt on the synthesis of ZSM-5 by template free crystallization method," Microporous and Mesoporous Materials; vol. 118 (2009) pp. 361-372.
Yanting Tang et al., "Template-free synthesis of beta zeolite membranes on porous $\alpha$-$Al_2O_3$ supports," Chem. Commun.; Royal Society of Chemistry; vol. 50 (2014) pp. 8834-8837.
Manuel Moliner et al., "Synthesis Strategies for Preparing Useful Small Pore Zeolites and Zeotypes for Gas Separations and Catalysis," Chemistry of Materials; vol. 26 (2014) pp. 246-258.
Nikolay Kosinov et al., "Influence of the Si/Al ratio on the separation properties of SSZ-13 zeolite membranes," Journal of Membrane Science; vol. 484 (2015) pp. 140-145.
Xiong Wang et al., "Atom-economical synthesis of a high silica CHA zeolite using a solvent-free route," ChemComm.; Royal Society of Chemistry; vol. 51 (2015) pp. 16920-16923.
Hua Shi, "Organic template-free synthesis of SAPO-34 molecular sieve membranes for $CO_2$-$CH_4$ separation," RSC Advances; Royal Society of Chemistry; vol. 5 (2015) pp. 38330-38333.
Jungkyu Choi et al., "MFI zeolite membranes from $\alpha$- and randomly oriented monolayers," Adsorption vol. 12 (2006) pp. 339-360.
Ali Boultif et al., "Powder pattern indexing with the dichotomy method," Journal of Applied Crystallography vol. 37 (2004) pp. 724-731.
Juan Rodrígues-Carvajal, "Recent advances in magnetic structure determination by neutron powder diffraction," Physica B; vol. 192 (1993) pp. 55-69.
Database of Zeolite Structures; fully revised 2017; http://www.iza-structure.org/databases/ (one page total).
Armel Le Bail, "Whole powder pattern decomposition methods and applications: A retrospection," Powder Diffr.; vol. 20 (2005) pp. 316-326.
V. Petříček et al., "Crystallographic Computing System JANA2006: General features," Z. Kristallogr. vol. 229, No. 5; (2014) pp. 345-352.
Pankaj Sharma et al., "Synthesis and morphological studies of nanocrystalline MOR type zeolite material," Journal of Colloid and Interface Science; vol. 325 (2008) pp. 547-557.
Linn Sommer et al., "Enhanced Catalyst Performance of Zeolite SSZ-13 in the Methanol to Olefin Reaction after Neutron Irradiation," The Journal of Physical Chemistry; vol. 115 (2011) pp. 6521-6530.
Rongfei Zhou et al., "Preparation of chabazite membranes by secondary growth using zeolite-T-directed chabazite seeds," Microporous and Mesoporous Materials; vol. 179 (2013) pp. 128-135.
Yuewei Ji et al., "Steam-dealuminated, OSDA-free RHO and KFI-type zeolites as catalysts for the methanol-to-olefins reaction," Microporous and Mesoporous Materials; vol. 232 (2016) pp. 126-137.

(56) References Cited

OTHER PUBLICATIONS

Martin Martis et al., "Tracking the structural changes in pure and heteroatom substituted aluminophosphate, AlPO-18, using synchrotron based X-ray diffraction techniques," RSC Publishing; PCCP; vol. 15 (2013) pp. 11766-11774.

Shiguang Li et al., "Modeling Permeation of $CO_2/CH_4$, $CO_2/N_2$, and $N_{2/CH4}$ Mixtures Across SAPO-34 Membrane with the Maxwell-Stefan Equations," Ind. Eng. Chem. Res.; vol. 46 (2007) pp. 3904-3911.

Nikolay Kosinov et al., "High flux high-silica SSZ-13 membrane for $CO_2$ separation," Journal of Materials Chemistry A; Royal Society of Chemistry; vol. 2 (2014) p. 13083-13092.

Xuehong Gu et al., "Synthesis of Defect-Free FAU-Type Zeolite Membranes and Separation for Dry and Moist $CO_2/N_2$ Mixtures," Ind. Eng. Chem. Res.; vol. 44 (2005) pp. 937-944.

Shiguang Li et al., "High-Flux SAPO-34 Membrane for $CO_2/N_2$ Separation," Ind. Eng. Chern. Res.; vol. 49 (2010) pp. 4399-4404.

Yihong Zheng et al., "Preparation of steam-stable high-silica CHA (SSZ-13) membranes for $CO_2/CH_4$ and $C_2H_4/C_2H_6$ separation," Journal of Membrane Science; vol. 475 (2015) pp. 303-310.

Zan Chen et al., "Functional defect-patching of a zeolite membrane for the dehydration of acetic acid by pervaporation," Journal of Membrane Science; vol. 369 (2011) pp. 506-513.

M.A. Snyder et al., "Combining simultaneous reflectance and fluorescence imaging with SEM for conclusive identification of polycrystalline features of MFI membranes," Microporous and Mesoporous Materials; vol. 76 (2004) pp. 29-33.

Deanna M. D'Alessandro et al., "Carbon Dioxide Capture: Prospects for New Materials," Angewandte Chemie Int. Edit.; vol. 49 (2010) pp. 6058-6082.

Matthew T. Snider et al., "Gas sorption studies on Zeolite Y membrane materials for post-combustion $CO_2$ capture in coal-fired plants," Microporous and Mesoporous Materials; vol. 192 (2014) pp. 3-7.

Rune Bredesen et al., "High-temperature membranes in power generation with $CO_2$ capture," Chemical Engineering and Processing; vol. 43 (2004) pp. 1129-1158.

Mayur Ostwal et al., "3-Aminopropyltriethoxysilane functionalized inorganic membranes for high temperature $CO_2/N_2$ separation," Journal of Membrane Science; vol. 369 (2011) pp. 139-147.

Haibo Zhai et al., "Water Use at Pulverized Coal Power Plants with Postcombustion Carbon Capture and Storage," Environmental Science & Technology; vol. 45 (2011) pp. 2479-2485.

Eric Favre et al., "Biogas, membranes and carbon dioxide capture," Journal of Membrane Science; vol. 328 (2009) pp. 11-14.

Robert Quinn et al., "A High Temperature Lithium Orthosilicate-Based Solid Absorbent for Post Combustion $CO_2$ Capture," Industrial & Engineering Chemistry Research; vol. 51 (2012) pp. 9320-9327.

Eunjoo Kim et al., "Chemical Vapor Deposition on Chabazite (CHA) Zeolite Membranes for Effective Post-Combustion $CO_2$ Capture," Environmental Science & Technology; vol. 48 (2014) pp. 14828-14836.

Shuji Himeno, "Synthesis and Permeation Properties of a DDR-Type Zeolite Membrane for Separation of $CO_2/CH_4$ Gaseous Mixtures," Ind. Eng. Chem. Res.; vol. 46 (2007) pp. 6989-6997.

Jonas Hedlund et al., "High-flux MFI membranes," Microporous and Mesoporous Materials; vol. 52 (2002) pp. 179-189.

Koji Kida et al., "Preparation and gas permeation properties on pure silica CHA-type zeolite membranes," Journal of Membrane Science; vol. 522 (2017) pp. 363-370.

Notification of Reason for Refusal dated Jan. 28, 2019 from the Korean Intellectual Property Office in application No. 10-2017-0153218.

Communication dated Aug. 20, 2019 (drafted Aug. 7, 2019), issued by the Japan Patent Office in corresponding application No. 2018-143781.

* cited by examiner

METHOD OF FABRICATING ORGANIC STRUCTURE DIRECTING AGENT-FREE CHA TYPE ZEOLITE MEMBRANE AND MEMBRANE FABRICATED THEREBY

TECHNICAL FIELD

The present invention relates to a method of fabricating an organic structure directing agent-free CHA type zeolite membrane and a membrane fabricated thereby, and more particularly to a method of fabricating a continuous CHA type zeolite membrane, which exhibits $CO_2/N_2$ and $CO_2/CH_4$ separation performances comparable with those of conventional membranes, in a cost-effective manner without a calcination process by hydrothermal synthesis using an alkali metal hydroxide without using an organic structure directing agent, and to a membrane fabricated thereby.

BACKGROUND ART

Zeolite membranes have been widely studied owing to their high performance for separating molecular mixtures based on their intrinsic molecular sieving ability and/or their capability for preferential adsorption (J. Caro et al., Microporous Mesoporous Mater. 38 (2000) 3-24; Z. P. Lai et al., Science 300 (2003) 456-460). Furthermore, the high thermal and chemical stabilities may render zeolite membranes suitable for separating industrially important mixtures (Z. P. Lai et al., Science 300 (2003) 456-460; H. Voß et al., J. Membr. Sci. 329 (2009) 11-17; W. G. Sun et al., J. Membr. Sci. 335 (2009) 83-88). Desirably, zeolite membranes should be able to separate mixtures of components with close boiling points (e.g., xylene isomers (Z. P. Lai et al., Science 300 (2003) 456-460), butene isomers (H. Voß et al., J. Membr. Sci. 329 (2009) 11-17; U.S. Pat. No. 3,723,561), and acetic acid/water mixtures (W. G. Sun et al., J. Membr. Sci. 335 (2009) 83-88), for which conventional thermodynamics-based separation processes are not viable options.

General zeolite membranes are synthesized by seed growth and hydrothermal synthesis. After zeolite particles which are used as seeds are deposited on a support, a continuous membrane is obtained by a hydrothermal reaction with a solution containing an organic structure directing agent. As the next step, a calcination process is performed in order to remove the organic structure directing agent used in the hydrothermal reaction, thereby forming pores.

Organic structure directing agents which are used in zeolite synthesis are mostly costly, and thus are factors that hamper the commercialization of zeolite membranes. Furthermore, since a high-temperature calcination process is required to remove the organic structure directing agent, the last synthesis step includes an energy consuming process. To overcome these disadvantages, many studies have been conducted on methods of synthesizing zeolite by seed growth without using an organic structure directing agent.

The secondary growth method, nowadays regarded as a reliable zeolite membrane synthesis methodology (M. A. Snyder et al., Angew. Chem.-Int. Edit. 46 (2007) 7560-7573), requires the batch-wise hydrothermal growth of a seed layer. Very often, organic structure directing agents (OSDAs; e.g., 1-adamantylamine for DDR (J. Van den Bergh et al., J. Membr. Sci. 316 (2008) 35-45), N,N,N-trimethyl-1-adamantammonium cation for CHA (TMAda$^+$) (U.S. Pat. No. 4,544,538), and tetrapropylammonium cation for MFI zeolites (G. T. Kokotailo et al., Nature 272 (1978) 437-438)) are added during secondary growth to achieve the reproducible production of high-quality zeolite membranes (E. Kim et al., J. Mater. Chem. A 5 (2017) 11246-11254; H. Kalipcilar et al., Chem. Mater. 14 (2002) 3458-3464). In the secondary growth methodology, the successful membrane formation is contingent on minimizing defect formation after the inevitable time- and energy-consuming thermal activation process (i.e., calcination) (J. Hedlund et al., J. Membr. Sci. 159 (1999) 263-273). An appropriate calcination step is requisite even for well-intergrown as-synthesized zeolite membranes to ensure their intrinsic separation ability. Indeed, the calcination step often results in the uncontrollable formation of unwanted defects that provide non-selective pathways to permeates and thus nullifies the intrinsic separation ability of the zeolite membrane (Y. Zhang et al., J. Membr. Sci. 363 (2010) 29-35). Although alternative activation approaches have been introduced, a membrane fabrication method that does not require the calcination step is highly attractive for realizing the intrinsic separation ability of the zeolite membrane. Thus, the synthesis of high-performance zeolite membranes free of organic structure directing agents (OSDAs) is highly desirable.

Hydrothermal growth without OSDAs has enabled the synthesis of several types of zeolites such as MFI (R. Lai et al., Microporous Mesoporous Mater. 38 (2000) 239-245), CHA (Y. Hasegawa et al., J. Membr. Sci. 347 (2010) 193-196; H. Imai et al., Microporous Mesoporous Mater. 196 (2014) 341-348; H. Shi et al., RSC Adv. 5 (2015) 38330-38333; X. Li et al., Microporous Mesoporous Mater. 143 (2011) 270-276) and BEA (Y. Tang et al., J. Phys. Chem. C 115 (2011) 774-450). As the main advantages, OSDA-free syntheses have cost-effectiveness due to the non-use of the OSDAs and energy-efficiency due to the lack of requirement for the calcination step (N. Rangnekar et al., Chem. Soc. Rev. 44 (2015) 7128-7154). An extensive literature survey showed that OSDA-free synthesis of MFI type zeolite membranes has been intensively studied (J. Hedlund et al., J. Membr. Sci. 159 (1999) 263-273; S. Gopalakrishnan et al., J. Membr. Sci. 274 (2006) 102-107). Some of these OSDA-free MFI zeolite membranes showed good performance for the separation of mixtures (hydrogen-hydrocarbon (C1-C4)) (M. Pan et al., Microporous Mesoporous Mater. 43 (2001) 319-327) or n-/i-$C_4H_{10}$ (S. Gopalakrishnan et al., J. Membr. Sci. 274 (2006) 102-107). It was noted that the separation performances of OSDA-free MFI zeolite membranes were comparable to and sometimes higher than that of the MFI membranes prepared with the OSDA (M. Pan et al., Microporous Mesoporous Mater. 43 (2001) 319-327). However, it appears that the successful formation of MFI membranes in the absence of OSDAs is largely limited to a very narrow region of compositional and hydrothermal conditions (N.Y. Kang et al., Microporous Mesoporous Mater. 118 (2009) 361-372). The high sensitivity and/or low reproducibility in the OSDA-free synthesis of MFI, CHA, and BEA zeolites have been addressed (R. Lai et al., Microporous Mesoporous Mater. 38 (2000) 239-245; X. Li et al., Microporous Mesoporous Mater. 143 (2011) 270-276; Y. Tang et al., Chem. Commun. 50 (2014) 8834-8837). The data indicate the importance of a rigorous approach toward OSDA-free membrane fabrication. To this end, the main factors, such as the Si/Al ratio and the cation species in the synthetic precursor, the amount of seed employed, and hydrothermal conditions, should be comprehensively elucidated. Based on such a rigorous approach, a reliable OSDA-free synthesis protocol can be secured and adopted for membrane manufacturing. Although parameter studies to determine the optimal conditions toward high-performance OSDA-free zeolite membranes have been conducted, the final successful synthetic route is presented in most studies (J. Hedlund et al., J. Membr. Sci. 159 (1999) 263-273H. Shi et al., RSC Adv. 5 (2015) 38330-38333).

Compared with MFI and BEA zeolites, the successful OSDA-free synthesis of 8-membered ring (MR) small pore zeolites such as CHA and DDR has not been widely reported, as it is plausibly difficult to form the small pore channels and large cavities without appropriate OSDAs (M. Moliner et al., Chem. Mater. 26 (2014) 246-258). Among the 8-MR zeolites, chabazite (CHA) zeolites with a pore size of $0.37 \times 0.42$ nm$^2$ are promising for separating $CO_2$ (0.33 nm) from larger molecules such as $N_2$ (0.364 nm) or $CH_4$ (0.38 nm); $CO_2/N_2$ and $CO_2/CH_4$ separations are respectively relevant to post-combustion carbon capture and bio-gas/natural gas upgrading. To date, most CHA membranes have been synthesized in the presence of the OSDA TMAda$^+$ and have been shown to be effective for $CO_2$ separation (M. Moliner et al., Chem. Mater. 26 (2014) 246-258; N. Kosinov et al., J. Membr. Sci. 484 (2015) 140-145; N. Kosinov et al., J. Mater. Chem. A 2 (2014) 13083-13092). However, the use of expensive OSDAs such as TMAdaOH and/or the co-SDA tetraethylammonium hydroxide (TEACH) for synthesizing the high-quality CHA membranes hampers their practical use (X. Wang et al., Chem. Commun. 51 (2015) 16920-16923). Thus, alternative synthetic approaches with inexpensive OSDAs (e.g., N,N,N-dimethylethylcyclohexylammonium bromide (X. Wang et al., Chem. Commun. 51 (2015) 16920-16923)) and even without OSDAs have been introduced (Y. Hasegawa et al., J. Membr. Sci. 347 (2010) 193-196; H. Imai et al., Microporous Mesoporous Mater. 196 (2014) 341-348; H. Shi et al., RSC Adv. 5 (2015) 38330-38333; X. Li et al., Microporous Mesoporous Mater. 143 (2011) 270-276). In particular, two types of the OSDA-free CHA and SAPO-34 membranes showed good performance for the separation of $H_2O$/ethanol mixtures (Y. Hasegawa et al., J. Membr. Sci. 347 (2010) 193-196) and $CO_2/CH_4$ (H. Shi et al., RSC Adv. 5 (2015) 38330-38333), respectively. Despite their promise, to the best of our knowledge, the effects of the above-mentioned influential factors on the synthesis of OSDA-free CHA membranes have not yet been addressed and discussed in a comprehensive way. Because the OSDA-free synthesis of small pore zeolites is highly challenging (M. Moliner et al., Chem. Mater. 26 (2014) 246-258), a rigorous analysis of the synthesis of OSDA-free CHA type zeolites under various synthetic conditions is desirable. The delineation of any correlations between the seeded growth of OSDA-free CHA particle and membrane formation should be remarkably instructive for obtaining CHA membranes as well as membranes of other zeolites.

However, studies on methods of synthesizing membranes using zeolite particles having a CHA structure suitable for carbon dioxide separation without using organic structure directing agents are still insufficient.

Accordingly, the present inventors have made extensive efforts to solve the above-described problems, and as a result, have found that a continuous CHA type zeolite membrane can be fabricated in a cost-effective manner without a calcination process by preparing a CHA type zeolite membrane by use of an alkali metal hydroxide without using an organic structure directing agent, and that the CHA type zeolite membrane exhibits high $CO_2/N_2$ separation ability even in the presence of water, thereby completing the present invention.

SUMMARY OF THE INVENTION

It is an object of the present invention to provide a method of fabricating a zeolite membrane, which exhibits performances comparable with those of a conventional membrane, in a cost-effective manner without using an organic structure directing agent, and a membrane fabricated thereby.

Another object of the present invention is to provide a $CO_2$ separation method using the membrane.

To achieve the above object, the present invention provides a method of fabricating an organic structure directing agent-free CHA type zeolite membrane, comprising: (a) forming a seed layer by depositing particles having a CHA structure on a support; and (b) fabricating a CHA type zeolite membrane by hydrothermally synthesizing the support on which the seed layer is formed in a synthetic precursor solution containing an alkali metal hydroxide (MOH wherein M is an alkali metal) and silica.

The present invention also provides a CHA type zeolite membrane which is fabricated by the above-described method and is free of an organic structure directing agent.

The present invention also provides a method of separating $CO_2$ from a mixture containing $CO_2$ and a small molecule, selected from the group consisting of $CH_4$, $N_2$, $O_2$, $C_2H_4$, $C_2H_6$, $C_3H_6$ and $C_3H_8$, by using the above-described CHA type zeolite membrane.

BRIEF DESCRIPTION OF THE DRAWINGS

FIGS. 16, 17 and 18 shows XRD patterns of OSDA-free particles (P_20_2d) according to an example of the present invention.

FIG. 18 shows XRD patterns of OSDA-free particles (P_50_1d) according to an example of the present invention.

BEST MODE FOR CARRYING OUT THE INVENTION

Unless otherwise defined, all technical and scientific terms used herein have the same meaning as commonly understood by one of ordinary skill in the art to which the present disclosure belongs. In general, the nomenclature used herein is well known and commonly used in the art.

A conventional method for synthesizing a zeolite membrane, which uses an expensive organic structure directing agent and obtains a final zeolite membrane through a calcination process, has problems in that cost competitiveness and commercialization are decreased due to high synthesis costs and complex fabrication steps. To overcome these problems, in the present invention, a continuous CHA type zeolite membrane was fabricated in a cost-effective manner without a calcination process by preparing a CHA type zeolite membrane by use of an alkali metal hydroxide without using an organic structure directing agent.

Therefore, in one aspect, the present invention is directed to a method of fabricating an organic structure directing agent-free CHA type zeolite membrane, comprising: (a) forming a seed layer by depositing particles having a CHA structure on a support; and (b) fabricating a CHA type zeolite membrane by hydrothermally synthesizing the support on which the seed layer is formed in a synthetic precursor solution containing an alkali metal hydroxide (MOH wherein M is an alkali metal) and silica.

Figure 1:
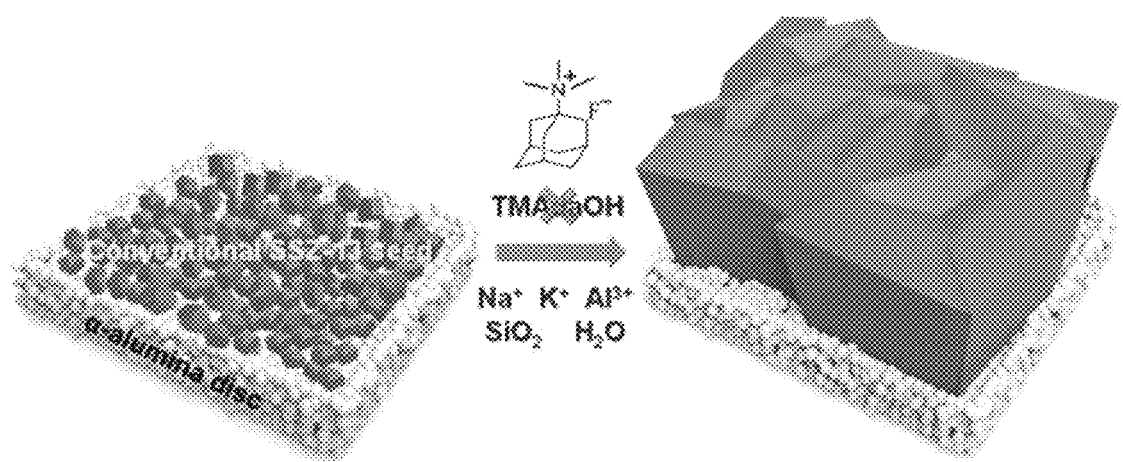
FIG. 1 is a schematic view showing a method of synthesizing a CHA type zeolite membrane by seed growth without an OSDA according to an example of the present invention.

FIG. 1 shows a method of synthesizing a CHA type zeolite membrane through hydrothermal growth of seed particles and a seed layer by use of an alkali metal hydroxide without using an OSDA according to the present invention.

Microporous CHA type zeolite is very promising for carbon dioxide capture because of its appropriate pores with molecular dimensions for the preferential adsorption of carbon dioxide molecules. CHA type zeolite particles and membranes may be prepared by using a seeded growth method in the absence of an organic structure directing agent (OSDA) or template. Very cheap inorganic reagents (KOH, NaOH, and $NaAlO_2$) were used as SDAs instead of the conventional OSDA, TMAdaOH, and thus a calcination step could be omitted. From an example performed to find appropriate and reliable conditions for obtaining continuous CHA type zeolite membranes, it was recognized that the formation of these membranes is a highly sensitive function of the Si/Al ratio in the synthetic precursor. Using an appropriate Si/Al ratio of ~50, OSDA-free CHA type zeolite membranes can be manufactured with high reproducibility.

In the present invention, the synthetic precursor solution may be composed at a molar ratio of $SiO_2$:$NaAlO_2$:MOH:$H_2O$=100:0 to 5:1 to 500:1000 to 100000, more preferably $SiO_2$:$NaAlO_2$:MOH:$H_2O$=100:1 to 3:1 to 100:5000 to 15000, most preferably $SiO_2$:$NaAlO_2$:MOH:$H_2O$=100:2:88:10000.

Herein, when NaOH and KOH are used simultaneously, the $SiO_2$:$NaAlO_2$:MOH:$H_2O$ molar ratio of the synthetic precursor solution may be 100:0 to 5:10 to 500:1 to 100:1000 to 100000, more preferably 100:1 to 3:50 to 100:1 to 50:5000 to 15000, most preferably 100:2:70:18:10000.

Herein, the Si:Al molar ratio of the synthetic precursor solution may be 25 to 95, preferably 40 to 60, more preferably 45 to 55, most preferably 50.

In the present invention, examples of a silica precursor contained in the synthetic precursor solution includes monomer silica, tetraalkylorthosilicate, silica sol, silica gel, sodium silicate, fumed silica, and colloidal silica. Preferably, fumed silica may be used as the silica precursor, but is not particularly limited thereto and all the silica precursors commonly used in the art to which the present invention pertains can be used.

In addition, examples of an aluminum precursor include sodium aluminate ($NaAlO_2$), aluminum isoproxide, aluminum nitrate hydrate, aluminum sulfate hydrate, and aluminum hydroxide. Preferably, sodium aluminate may be used as the aluminum precursor, but is not particularly limited thereto and all the aluminum precursors commonly used in the art to which the present invention pertains can be used.

An alkali metal in the alkali metal hydroxide may be selected from the group consisting of Li, Na, K, and mixtures thereof. Preferably, Na and/or K are/is used as alkali metal, and most preferably, Na and K are used simultaneously as alkali metal, but the scope of the present invention is not limited thereto.

In the present invention, the method may further include, after the hydrothermal synthesis of step (b), a step of drying the support.

In the present invention, the support may be one or more selected from the group consisting of alumina, polypropylene, polyethylene, polytetrafluoroethylene, polysulfone, polyimide, silica, glass, gamma alumina, mullite, zirconia, titania, yttria, ceria, vanadia, silicon, stainless steel, and carbon.

In the present invention, step (b) may be performed at a temperature of 100-250° C. for 12-120 hours, preferably 175° C. for 24-36 hours.

In the OSDA-free synthesis of particles in the present invention, an Si/Al ratio lower than or equal to ~50 and a reaction time of ~1 d make it possible to obtain high-purity CHA type zeolites. In contrast, a lower Al content and prolonged hydrothermal reaction time can lead to formation of undesired MOR type zeolite. In addition, synthetic conditions similar to those employed for particle synthesis may be directly extended to the intergrowth of an SSZ-13 seed layer in order to obtain OSDA-free CHA type zeolite membranes.

Further, it was found that a CHA type zeolite membrane having conventional performances through an inexpensive synthesis method without using an organic structure directing agent can obtained in the present invention.

The fabricated OSDA-free CHA type zeolite membranes showed maximum $CO_2/N_2$ and $CO_2/CH_4$ separation factors of about 12.5±3.8 and about 28.8±6.9, respectively, with a moderate $CO_2$ permeance of about $1\times10^{-7}$ mol·m$^{-2}$·s$^{-1}$·Pa$^{-1}$. Notably, under more realistic wet conditions (i.e., in the presence of $H_2O$ vapor), the separation performance at temperatures above 75° C. was comparable to that obtained under dry conditions, although permeation was hindered below 50° C., apparently due to the strong adsorption of $H_2O$ vapor.

Therefore, in another aspect, the present invention is directed to a CHA type zeolite membrane which is fabricated by the above-described method, is free of an organic structure directing agent, and has a continuous plane.

In still another aspect, the present invention is directed to a method of separating $CO_2$ from a mixture containing $CO_2$ and a small molecule, selected from the group consisting of $CH_4$, $N_2$, $O_2$, $C_2H_4$, $C_2H_6$, $C_3H_6$ and $C_3H_8$, by using the above-described CHA type zeolite membrane.

In the present invention, the method of separating $CO_2$ may be performed at 30-200° C. under dry conditions, and at 75-200° C. under moisture conditions.

The $CO_2$ separation performance of M_50_1d is comparable with that of conventional CHA membranes obtained using OSDAs. Although no permeate was detected below ~50° C., apparently due to inhibition by $H_2O$ udner wet conditions, high $CO_2/N_2$ and $CO_2/CH_4$ separation performances were achieved at a higher temperature of ~75° C., where the strength of adsorption of $H_2O$ vapor was less pronounced. The $CO_2/N_2$ and $CO_2/CH_4$ separation performances under wet conditions were well maintained up to ~125 to 150° C. Long-term stability tests for the separation of $CO_2/N_2$ and $CO_2/CH_4$ mixtures at 100° C. under wet conditions showed no noticeable degradation, supporting the high structural robustness of the OSDA-free CHA type zeolite membranes.

The OSDA-free CHA type zeolite membrane according to the present invention can be applied to $CO_2$ (0.33 nm)/$N_2$ (0.364 nm) separation necessary for post-combustion carbon capture. In particular, the OSDA-free CHA type zeolite membrane has an effect in that it can be applied to a continuous separation process as retaining the $CO_2/N_2$ separation performance although water is present in an exhaust gas after combustion. In addition, it can also be applied to $CO_2$ (0.33 nm)/$CH_4$ (0.38 nm) separation for obtaining selectively methane from a bio-gas or natural gas field. When benzene and hydrogen are produced by a direct conversion reaction of methane, hydrogen can be selectively separated to ensure a high methane conversion rate. Additionally, because the OSDA-free CHA type zeolite membrane can also be applied to the reduction of $NO_x$ in the exhaust gas of automobiles, it is expected to be highly likely to be applied to the atmosphere purification technologies.

Hereinafter, the present invention will be described in further detail with reference to examples. It will be obvious to a person having ordinary skill in the art that these examples are for illustrative purposes only and are not to be construed to limit the scope of the present invention.

Preparation Example 1

Synthesis of Conventional CHA Type Zeolite Particles (SSZ-13)

SSZ-13 seed particles were synthesized according to a conventional literature method by employing TMAdaOH (N,N,N-trimethyl-1-adamantammonium hydroxide) as an OSDA (H. Kalipcilar et al., Chem. Mater. 14 (2002) 3458-3464, U.S. Pat. No. 4,544,538).

Specifically, certain amounts of TMAdaOH (SACHEM Inc.), NaOH (Sigma-Aldrich), Al(OH)$_3$ (Sigma-Aldrich), and fumed silica (Cab-O-Sil M5, Cabot) were sequentially added to deionized water. The final molar composition was 20NaOH:5Al(OH)$_3$:100 5Al(OH)$_3$:100SiO$_2$:4400H$_2$O:20TMAdaOH. This precursor was thoroughly mixed in a shaking machine overnight and then poured into a Teflon liner. The Teflon liner was placed in a stainless steel autoclave. The hydrothermal reaction was carried out at 160° C. for 4 days under rotation in a forced convection oven. After completing the hydrothermal reaction, the resulting solid particles were recovered by a combination of centrifugation, decanting, and washing with fresh deionized water. Calcination was performed at 550° C. at a ramp rate of 1° C./min under air flow at 200 cc/min. These SSZ-13 particles were used as seeds in the synthesis of OSDA-free CHA type zeolite particles and membranes. For convenience, conventional SSZ-13 particles, obtained using TMAdaOH as an OSDA, were used as a reference and are hereinafter denoted as C-SSZ-13 particles.

Preparation Example 2

Synthesis of OSDA-Free CHA Type Zeolite Particles

Along with the C-SSZ-13 particles, the present inventors synthesized OSDA-free CHA type zeolite particles via the seeded growth method. Here, the C-SSZ-13 particles played the role of nuclei, while the alkali metal cations (Na$^+$ and K$^+$) were used as inorganic SDAs to grow the CHA type zeolite particles from the seed particles. Specifically, the C-SSZ-13 particles were added to a synthetic precursor with a molar composition of x NaAlO$_2$ (Sigma-Aldrich, Al (50-56 wt %):Na (40-45 wt %)): 70 NaOH (Sigma-Aldrich): 18 KOH (Sigma-Aldrich):10000 H$_2$O (x=0, 1, 2, and 5, corresponding to nominal Si/Al ratios of ∞, 100, 50, and 20, respectively). For preparation of the synthetic precursor, certain amounts of NaOH (pellet form), KOH (pellet form), NaAlO$_2$, and fumed silica (Cab-O-Sil M5, Cabot) were added to deionized water. To form a homogeneous precursor, the mixture was further blended on a shaking machine for 2 days. After the mixture became homogeneous and almost translucent, about 0.1 g of the C-SSZ-13 particles was added to 30 g of the synthetic precursor, followed by additional mixing with the shaking machine for 1 day. The final mixture was poured into a Teflon liner and the Teflon liner was moved to a stainless steel autoclave for reaction. The hydrothermal reaction was carried out at 175° C. for different times (1, 2, and 3 days) under rotation in a forced convection oven. After completing the hydrothermal reaction by quenching with tap water, the solid particles, synthesized in the absence of OSDAs, were recovered by repeated centrifugation, decanting, and washing with deionized water. For convenience, the resulting particles are referred to as P_x_yd, where P represents the OSDA-free particles and x and y indicate the nominal Si/Al ratio and hydrothermal reaction time (in days), respectively.

Preparation Example 3

Synthesis of OSDA-Free CHA Type Zeolite Membranes

Porous α-alumina discs with a thickness of about 2 mm and a diameter of about 22 mm were prepared according to a method reported in other study (J. Choi, et al., Adsorption 12 (2006) 339-360) and were used as supports for the OSDA-free CHA type zeolite membranes. The C-SSZ-13 particles prepared in Preparation Example 1 were deposited on α-alumina discs via dip-coating. Prior to dip coating, a seed suspension was prepared by adding about 0.05 g of the C-SSZ-13 particles to about 40 ml of ethanol, followed by sonication for about 20 minutes. One side of the α-alumina disc, which was previously polished with a sand paper, was brought into contact with the seed suspension for 30 seconds, and the disc was withdrawn from the seed suspension and dried for 30 seconds under ambient conditions. This dip-coating procedure was repeated four times in order to cover the disc surface. The C-SSZ-13 particles deposited on the α-alumina disc were calcined at 450° C. for 4 hours at a ramp rate of 1° C./min under air flow at 100 cc/min. For secondary growth, a synthetic precursor was prepared using the same procedure used for synthesis of the OSDA-free particles in Preparation Example 2. Accordingly, the synthetic precursor included 100silica:70NaOH:18KOH:x $NaAlO_2$ (x=0, 1, 2, and 5):10000$H_2O$ by mole. The α-alumina disc with the seeded side facing down was placed in a tilted position in a Teflon liner, and the prepared synthetic precursor was then added. The Teflon liner was mounted in an autoclave. The hydrothermal reaction for secondary growth was carried out at 175° C. for a certain period under static conditions; the oven temperature was increased from room temperature to the target temperature (175° C.) at a rate of about 5° C./min. The final reaction duration includes the time for heat ramping. After a fixed hydrothermal reaction time, the reaction was quenched by immersing the autoclave under tap water. The recovered membrane samples were washed with deionized water, and then soaked in deionized water overnight to remove undesired impurities. Subsequently, the membrane samples were slowly dried at room temperature over 3 days and further dried at 100° C. in an oven before performing the gas permeation experiment. For convenience, the resulting membrane samples are referred to as M_x_yd, similar to the nomenclature adopted for the particle samples in Preparation Example 2.

Example 1

Analysis of Morphology of OSDA-Free CHA Type Zeolite Particles

Scanning electron microscope (SEM) images were obtained using a Hitachi S-4300 instrument, and the surfaces of all the particle and membrane samples were Pt-coated at 15 mA for 100 seconds. X-ray diffraction (XRD) patterns were obtained using a Rigaku Model D/Max-2500V/PC diffractometer (Japan) with Cu $K_\alpha$ radiation (λ=0.154 nm). The simulated XRD patterns of CHA and MOR zeolites were obtained using the Mercury software (available from the Cambridge Crystallographic Data Centre; CCDC) with a crystallographic information file (CIF) that was downloaded from the International Zeolite Association (IZA). $N_2$ adsorption isotherms of some particle samples were obtained at 77 K by use of an ASAP 2020 instrument (Micromeritics Inc.). Fluorescent confocal optical microscopy (FCOM) analysis was performed according to the method described in the literature, except for the use of a solid state laser with a wavelength of 488 nm as a source (E. Kim et al., J. Mater. Chem. A 5 (2017) 11246-11254). For structural analysis of the CHA type zeolites, X-ray diffraction data were collected in reflection mode using a Rigaku Model D/MAX Ultima III instrument (Japan) with Cu $K_\alpha$ radiation (λ=0.154 nm). The accelerating voltage and current were 40 kV and 40 mA, respectively. Data for the sample were obtained at room temperature in flat-plate mode with a step size of 0.02° for a scan time of 10 seconds per step over the 2θ range of 2 to 100°. The diffraction patterns were indexed using the DICVOLO6 program implemented in the FullProf program suite (A. Boultif et al., J. Appl. Cryst. 37 (2004) 724-731; J. Rodríguez-Carvajal, Physica B 192 (1993) 55-69). The initial structure of the framework of the CHA type zeolite, acquired from the Database (http://www.iza-structure.org/databases/) of Zeolite Structures, was utilized for Le Bail refinement to determine lattice parameters (A. Le Bail, Powder Diffr. 20 (2005) 316-326). Le Bail refinement was performed using the Rietveld method in the JANA2006 package (V. Petříček et al., Z. Kristallogr. 229 (2014) 345-352). The low angle XRD diffraction data below 5° was excluded for the Le Bail refinement owing to the large background component. Separation of $CO_2/N_2$ and $CO_2/CH_4$ mixtures by using the OSDA-free CHA type zeolite membranes was conducted using a home-made permeation system in the Wicke-Kallenbach mode; the total pressure of both the feed and permeate sides was held at about 1 atm. The partial pressures of $CO_2$ and $N_2$ (or $CH_4$) in the $CO_2/N_2$ and $CO_2/CH_4$ mixtures used for the permeation tests under dry feed conditions were 50.5 kPa and 50.5 kPa, respectively (referred to as DRY $CO_2/N_2$ or DRY $CO_2/CH_4$, respectively), while the partial pressures of $CO_2$, $N_2$ (or $CH_4$), and $H_2O$ used for the $CO_2/N_2$ and $CO_2/CH_4$ separation tests under wet feed conditions were 49 kPa, 49 kPa, and 3 kPa, respectively (referred to as WET $CO_2/N_2$ or WET $CO_2/CH_4$, respectively). The flow rate of the feed mixture and the He sweep was maintained at about 100 mL·$min^{-1}$. As an internal standard for reliable gas chromatographic analysis, about 5 mL·$min^{-1}$ of $CH_4$ for the $CO_2/N_2$ mixtures and of $H_2$ for the $CO_2/CH_4$ mixtures were added to the permeate stream carried to a gas chromatograph (GC) column by the He sweep gas. A GC (YL 6100 GC system, YOUNG LIN, South Korea) equipped with a packed column (6 ft×⅛" Porapak T) and a thermal conductivity detector (TCD) was used for on-line detection of the $CO_2/N_2$ permeates, whereas a GC (YL Instrument, 6500 GC System) equipped with a capillary column (30 m×0.320 mm GS-GasPro) and a pulsed discharge ionization detector (PDD) was used for on-line detection of the $CO_2/CH_4$ permeates.

Figure 2:
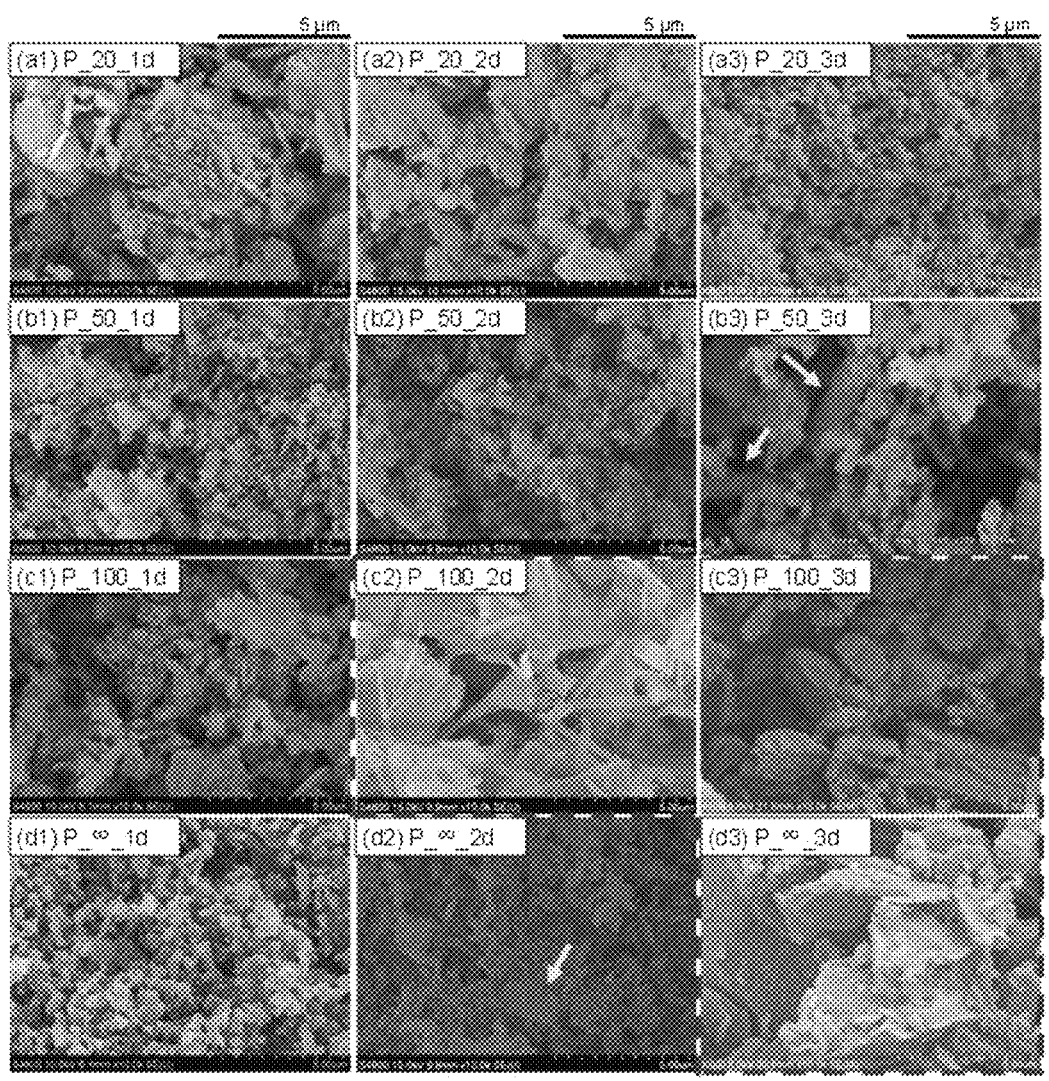
FIG. 2 depicts SEM images of CHA type zeolite particles obtained by seed growth according to an example of the present invention.

FIG. 2 shows SEM images of the particles obtained using the seeded growth method in the absence of TMAdaOH as an OSDA; the Si/Al ratios and reaction times were varied. FIG. 2 shows SEM images of P_20 ($1^{st}$ row), P_50 ($2^{nd}$ row), P_100 ($3^{rd}$ row), and P_∞ ($4^{th}$ row)) for various synthesis times of 1 ($1^{st}$ column), 2 ($2^{nd}$ column), and 3 d ($3^{rd}$ column). Yellow arrows are used to indicate particles of other phases. Blue dashed lines are used to designate the different morphologies of the obtained particles shown in (c2), (c3), and (d3). All scale bars represent 5 μm.

Figure 13:
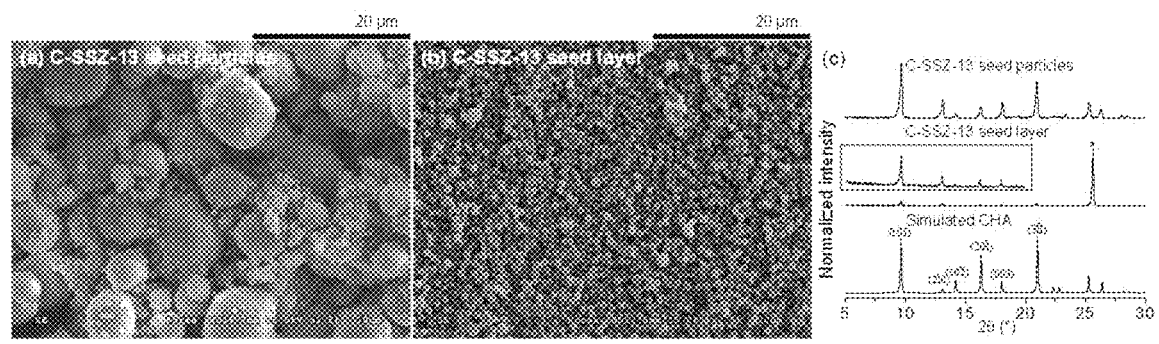
FIG. 13 shows SEM images and XRD patterns of C-SSZ-13 seed particles and a C-SSZ-13 seed layer according to an example of the present invention.

FIG. 13 shows SEM images of (a) C-SSZ-13 seed particles and (b) a seed layer obtained by applying a dip coating method to the particles shown in (a). The smaller particles (<about 700 nm) in (a) were selectively deposited on supports because bulkier particles were allowed to precipitate from a suspension. In FIG. 13(c), the simulated XRD pattern of all-silica CHA type zeolite is shown, and the asterisk (*) indicates the peak of the α-$Al_2O_3$ disc.

In all cases, the morphologies and sizes of the OSDA-free particles were different from those of the C-SSZ-13 particles (FIG. 13), which were added to serve as seeds for the seeded growth. This difference suggests that the C-SSZ-13 seed particles underwent decomposition during the seeded growth. For the 1-day seeded growth, while P_20_1d was mainly composed of aggregated plate-like particles ((a1) in FIG. 2), P_x_1d (x=50, 100, and ∞) was composed of small, irregular-shaped grains ((b1) to (d1) in FIG. 2). For a longer duration of 2 days, P_20_2d and P_50_2d ((a2)-(b2) in FIG. 2) had small, irregular-shaped grains, similar to P_x_1d (x=50, 100, and ∞). On the contrary, P_100_2d was composed of sharp, plate-like particles with minor needle-like particles ((c2) in FIG. 2), similar to the morphology of MOR zeolites reported in the prior art (P. Sharma et al., J. Colloid Interf. Sci. 325 (2008) 547-557), whereas P_∞_2d was still comprised of small, irregular-shaped grains (similar to P_∞_1d), though some undefined, large particles were observed, as indicated by the yellow arrow in (d2) of FIG. 2. A longer duration of 3 days resulted in a pronounced change in the morphology of the resulting particles ((b3)-(d3) of FIG. 2). Specifically, P_x_3d (x=100 and ∞) was likely to grow into larger particles with a more defined morphology, while the particles of P_20_3d still had the small, irregular shape, and P_50_3d contaiend some larger particles (indicated by yellow arrows in (b3) of FIG. 2). The estimated yields of all the syntheses are summarized in Table 1 below. The yields for the syntheses with nominal Si/Al ratios of 100 and ∞ suggest little or no seeded growth after 1 day, whereas a longer duration led to larger particles with sharp edges (see (c1)-(c3) and (d1)-(d3) of FIG. 2). This change in the particle morphology might suggest a gradual change toward another zeolite phase. In contrast, in the syntheses with lower nominal Si/Al ratios (i.e., 20 and 50), the irregular-shaped morphology was preserved for up to 3 days and the corresponding yields increased monotonically (see (a1)-(a3) or (b1)-(b3) of FIG. 2). This suggests preservation of the original zeolite phase and enhanced synthesis with time, though some impurities were co-generated, as indicated by the yellow arrows in (b3) of FIG. 2.

TABLE 1

Yields and zeolite structure types of
P_20_xd, P_50_xd, P_100_xd, and P_∞_xd (x = 1, 2, and 3)

| | Hydrothermal reaction time (days) | | | | | |
|---|---|---|---|---|---|---|
| | 1 | | 2 | | 3 | |
| | Yield (%)[a] | Phase | Yield (%)[a] | Phase | Yield (%)[a] | Phase |
| P_20 | 15 | CHA | 19.1 | CHA | 33 | CHA |
| P_50 | 2.1 | CHA | 7.4 | CHA + MOR[d] | 37 | CHA + MOR[d] |
| P_100 | N/A[b] | CHA[c] | 4.9 | MOR | 30 | MOR |
| P_∞ | N/A[b] | CHA[c] | N/A[b] | CHA[c] + MOR[d] | N/A[b] | MOR |

[a]Yield: (increased weight after drying − seed amount)/silica amount in the precursor.
[b]The amount of particles recovered was less than the given seed amount (herein, 0.1 g) in the precursor.
[c]A CHA phase seemingly resulted from the dissolution of the C-SSZ-13 seed particles during seeded growth.
[d]A minor portion of MOR zeolite was present in the mixture of MOR and CHA type zeolite particles.

Example 2

Phase Evaluation of OSDA-Free Particles

Figure 3:
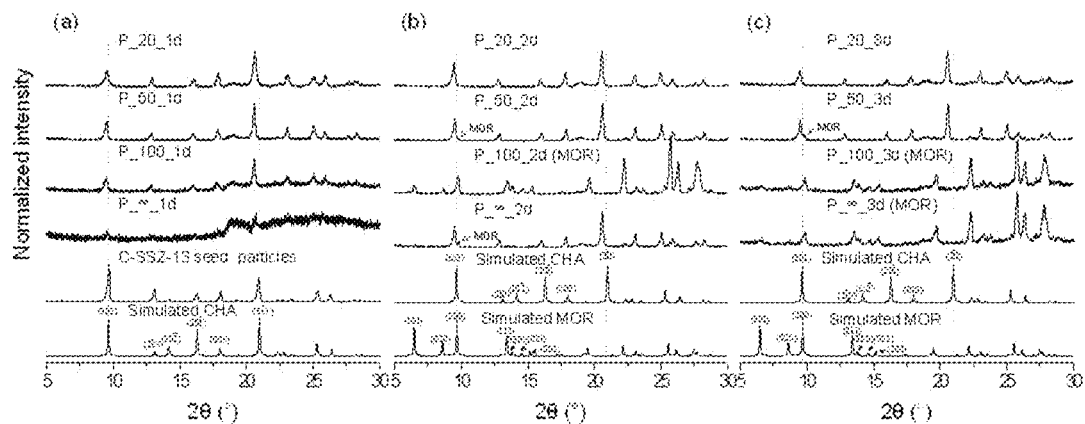
FIG. 3 is a graph showing the XRD patterns of CHA type zeolite particles obtained by seed growth according to an example of the present invention.

FIG. 3 shows XRD patterns of the particles shown in FIG. 2; P_20, P_50, P_100, and P_∞ particles obtained at various synthesis times of (a) 1 day, (b) 2 days, and (c) 3 days. XRD pattern of C-SSZ-13 particles used as seeds is included in (a). The simulated XRD pattern of all-silica CHA type zeolite is included in (a)-(c), and the XRD pattern simulated for MOR zeolite is included in (b)-(c) for comparison. The arrows indicate the peak of MOR zeolite as a minor phase in P_50_2d, P_50_3d, and P_∞_2d. The samples that contained the MOR zeolite as a major phase are indicated by MOR in parentheses next to the sample name. Gray dashed lines that indicate the XRD peaks of the (101) and (3$\bar{1}$1) planes in the simulated XRD pattern of CHA type zeolites are included.

The 1-day seeded growth gave rise to pure CHA type zeolites (FIG. 3(a)) irrespective of the Si/Al ratio (i.e., P_x_1d; x=20, 50, 100 and ∞). The XRD pattern of P_100_1d showed a low signal-to-noise ratio, as compared with the patterns of P_20_1d and P_50_1d, indicating unfavorable growth of the zeolite in the former. Furthermore, the XRD pattern of P_∞_1d indicated a lower degree of crystallization of the CHA type zeolite. For the cases of P_100_1d and P_∞_1d, the XRD patterns, as well as the very low yields, indicate that the C-SSZ-13 particles, which are supposed to serve as the seeds, were partially dissolved and/or collapsed instead of proceeding to crystal growth. Thus, the corresponding SEM image in FIG. 2(d1) reveals a morphology comprising dissolved and/or collapsed C-SSZ-13 seed particles. For the 2-day seeded growth, the present inventors found that P_20_2d had the pure CHA type zeolite, whereas P_100_2d and P_x_2d (x=50 and ∞) contained MOR zeolite as the major phase and a very small quantity of the MOR phase, respectively. After the longer reaction time of 3 days, the MOR zeolite phases were pronounced in P_x_3 (x=100 and ∞), whereas the phases of P_x_3d (x=20 and 50) were still comparable to those of P_x_2d (x=20 and 50). From the SEM images in FIG. 2, it can be concluded that some particles with a different morphology (indicated by yellow arrows in FIGS. 2(b3) and 2(d2)) were associated with the MOR zeolite particles and the particles with a more defined morphology shown in FIGS. 2(c2), 2(c3) and 2(d3) and 2(d3) were MOR zeolite particles. From the various synthesis results, it appears that given the duration of seeded growth, a lower but finite Al content in the synthetic precursor favored transformation of the CHA structure into the MOR structure (i.e., P_100 series), indicating the important role of Al atoms in the synthesis of CHA type zeolite during OSDA-free synthesis. In addition, a longer reaction time resulted in phase transformation from CHA to MOR zeolites in the cases of P_50, P_100, and P_∞, though among them P_50 exhibited the lowest degree for phase transformation, also supporting the importance of Al content. This phase transformation may be correlated with the aforementioned pronounced morphological change observed in the SEM images (FIG. 2(c1)-(c3) and 2(d1)-(d3)). This phase transformation is in good agreement with the previous report that a prolonged reaction time resulted in the synthesis of the undesired MOR type zeolite (H. Imai et al., Microporous Mesoporous Mater. 196 (2014) 341-348). From the SEM and XRD characterizations, the OSDA-free synthesis with nominal Si/Al ratios of less than and equal to ~50 was appropriate for obtaining CHA type zeolite particles as the major phase using a reaction time of up to 3 days.

Example 3

Structural Properties of OSDA-Free CHA Particles

Figure 4:
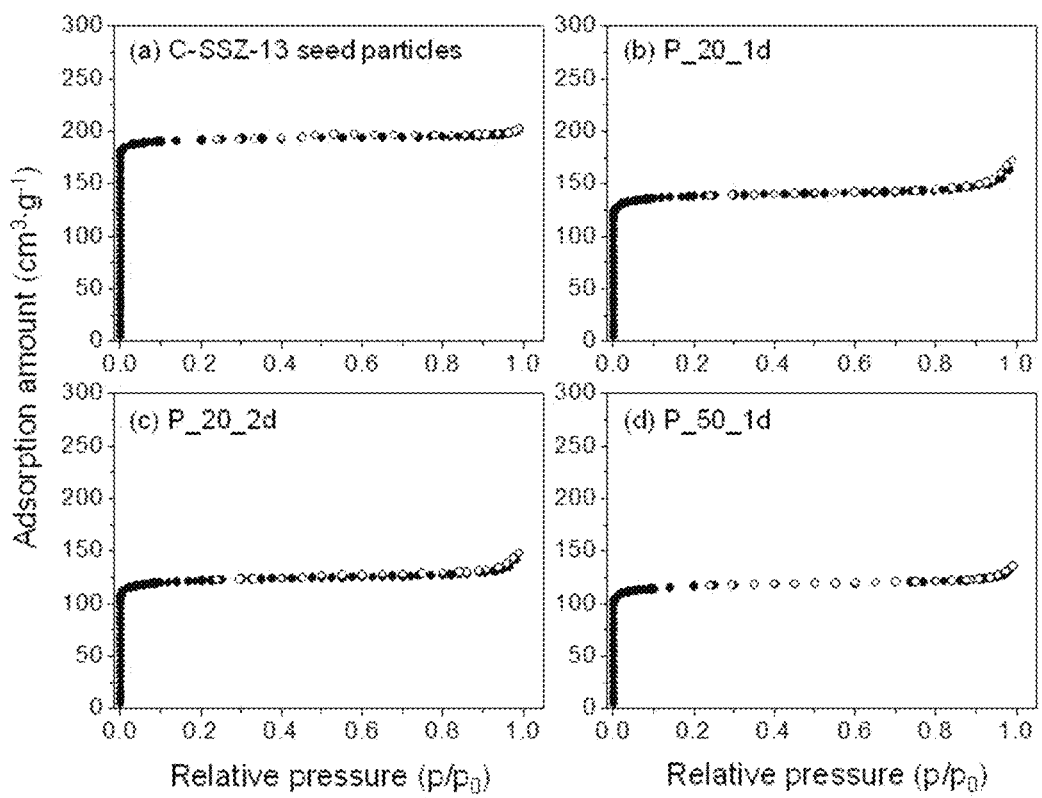
FIG. 4 depicts graphs showing the $N_2$ adsorption isotherms of CHA type zeolite particles obtained by seed growth according to an example of the present invention.

Among the synthesized particles, the present inventors chose three representative OSDA-free CHA particles (P_20_1d, P_20_2d, and P_50_1d) and further measured their $N_2$ adsorption isotherms at 77 K, along with that of the C-SSZ-13 seed particles as a reference (FIG. 4). FIG. 4 shows N$_2$ adsorption isotherms of (a) C-SSZ-13 seed particles, (b) P_20_1d, (c) P_20_2d, and (d) P_50_1d at 77 K. The filled and vacant symbols represent adsorption and desorption points, respectively.

The BET surface area of the SSZ-13 particles (740±3.8 m$^2$·g$^{-1}$) was comparable to the reported values (611-775 m$^2$·g$^{-1}$) (L. Sommer et al., J. Phys. Chem. C 115 (2011) 6521-6530). However, the BET surface areas of P_20_1d, P_20_2d, and P_50_1d were found to be lower at 557±2.0, 491±1.7, and 397±2.2 m$^2$·g$^{-1}$, respectively. It appears that the OSDA-free synthesis led to a reduction of the effective pore size of the resulting particles, which could in turn be attributed to the cations (R. Zhou et al., Microporous Mesoporous Mater. 179 (2013) 128-135) present in the CHA type zeolite framework because of the low Si/Al ratio. Indeed, it was reported that the OSDA-free particles of small pore zeolites such as CHA, RHO and KFI tend to have a low Si/Al ratio (generally, Si/Al≤~10)(M. Moliner et al., Chem. Mater. 26 (2014) 246-258; Y. Ji et al., Microporous Mesoporous Mater. 232 (2016) 126-137), and accordingly, contain a large amount of cations. Moreover, the N$_2$ adsorption amounts of the OSDA-free CHA particles are lower than those of the CHA type zeolite and zeotype (SAPO-34) particles synthesized with organic templates (H. Imai et al., Microporous Mesoporous Mater. 196 (2014) 341-348; H. Shi et al., RSC Adv. 5 (2015) 38330-38333). Similarly, the three OSDA-free CHA type zeolite particles synthesized in the present invention also had low Si/Al ratios of about 4.1-4.2 and about 5.5 (Table 2) compared with their nominal Si/Al ratios of 20 and 50, respectively. Thus, it is reasonable to consider that cations compensating the charge balance of Al$^{3+}$ in the framework were present inside the framework.

ticles are almost identical to those in the simulated XRD pattern (as indicated by red dashed lines), whereas those of the three OSDA-free particles shifted to lower 2θ values (as indicated by blue dashed lines).

A previous study (H. Imai et al., Microporous Mesoporous Mater. 196 (2014) 341-348) also reported a left shift of the XRD peaks of template-free CHA particles, though such phenomenon was not addressed or discussed. In the present invention, the present inventors further attempted to estimate the cell parameters of P_20_1d, P_20_2d, and P_50_1d by using the Le bail refinement. This refinement revealed that all three particles had slightly longer lattice parameters in terms of the a (or b) axis and c axis than those of the C-SSZ-13 particles. This increase was presumably due to framework expansion, which in turn originated from electrostatic repulsion between the alkali cations in the pore structure; the Le bail refinement data for the C-SSZ-13 particles and the template-free CHA particles (P_20_1d, P_20_2d, and P_50_1d) are compared with their respective XRD patterns in FIGS. 15 to 18. The lattice expansion depends on the amount and/or size of cations present inside the zeolite pore structure (M. Martis et al., Phys. Chem. Chem. Phys. 15 (2013) 11766-11774). Given that the OSDA-free particles have lower BET surface areas, the alkali cations (here, Na$^+$ and K$^+$), which were presumably present in excess in the CHA type zeolite (Table 2), blocked the micropores and thus inhibited the diffusion of N$_2$ into the pores (R. Zhou et al., Microporous Mesoporous Mater. 179 (2013) 128-135).

In general, the present inventors found that the actual Si/Al ratio of the OSDA-free particles determined by energy dispersive X-ray (EDX) analysis was not comparable to the

TABLE 2

Structural parameters of C-SSZ-13 particles, P_20_1d, P_20_2d, and P_50_1d estimated via the Le Bail Refinement and EDX data.

| | BET Surface area (m$^2$/g) | Structural parameters | | | EDX analysis (atomic %) | | | (Na + K)/ (Si + Al) |
|---|---|---|---|---|---|---|---|---|
| | | a/Å | c/Å | V/Å$^3$ | Na/Al | K/Al | Si/Al | |
| C-SSZ-13 particles | 740 ± 3.8 | 13.5920 (10) | 14.7532 (15) | 2360.4 (3) | 0.45 | — | 23 | 0.02 |
| P_20_1d | 557 ± 2.0 | 13.776 (2) | 14.894 (4) | 2447.9 (9) | 0.35 | 0.81 | 4.1 | 0.23 |
| P_20_2d | 491 ± 1.7 | 13.7580 (15) | 14.859 (2) | 2435.8 (5) | 0.27 | 0.81 | 4.2 | 0.21 |
| P_50_1d | 397 ± 2.2 | 13.7670 (9) | 14.8597 (12) | 2439.1 (3) | 0.49 | 0.90 | 5.5 | 0.21 |

The values of R$_p$ (profile factor) in the Le Bail Refinement for C-SSZ-13 seed particles, P_20_1d, P_20_2d, and P_50_1d were 4.31, 4.84, 5.45, and 4.83, respectively, while the GOF (Goodness of Fit) values in the same order were 7.18, 6.44, 7.33, and 5.91, respectively.

Furthermore, the changes in the cell parameters of the three OSDA-free CHA particles were also elucidated in an effort to comprehend their lower BET surface areas. The XRD peaks of the OSDA-free particles were generally shifted to lower 2θ values (FIGS. 3(a) and 3(b), and 14), indicating an expansion of the unit cell parameters.

Figure 14:
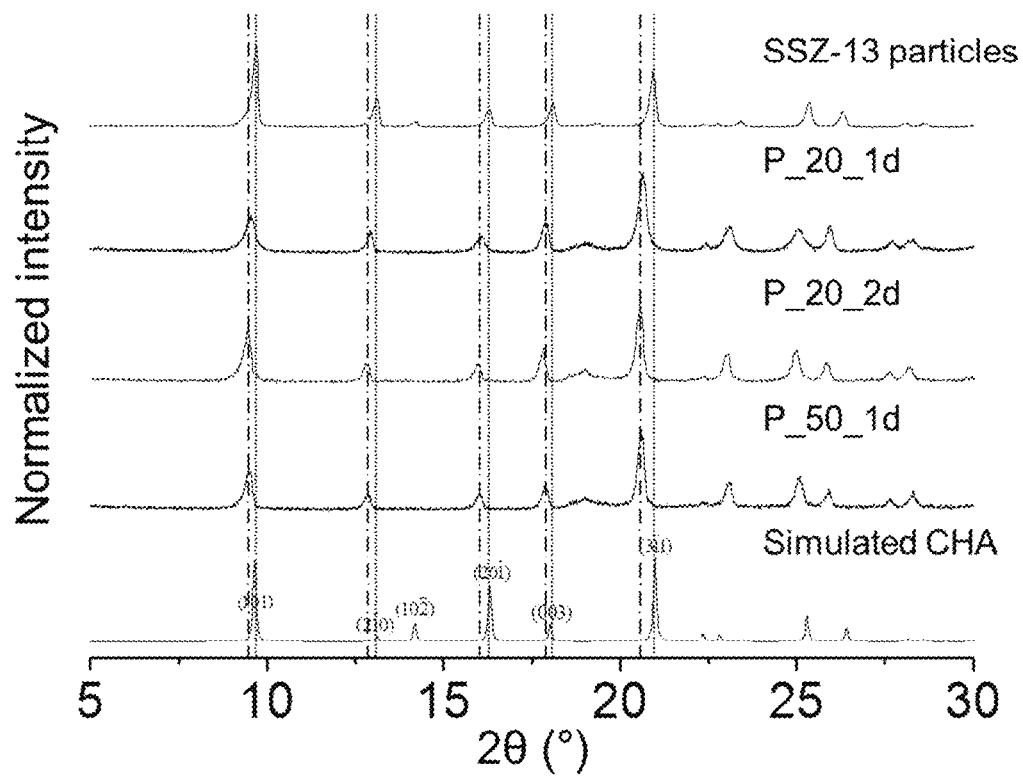
FIG. 14 shows XRD patterns of C-SSZ-13 seed particles and OSDA-free particles according to an example of the present invention.
Figure 15:
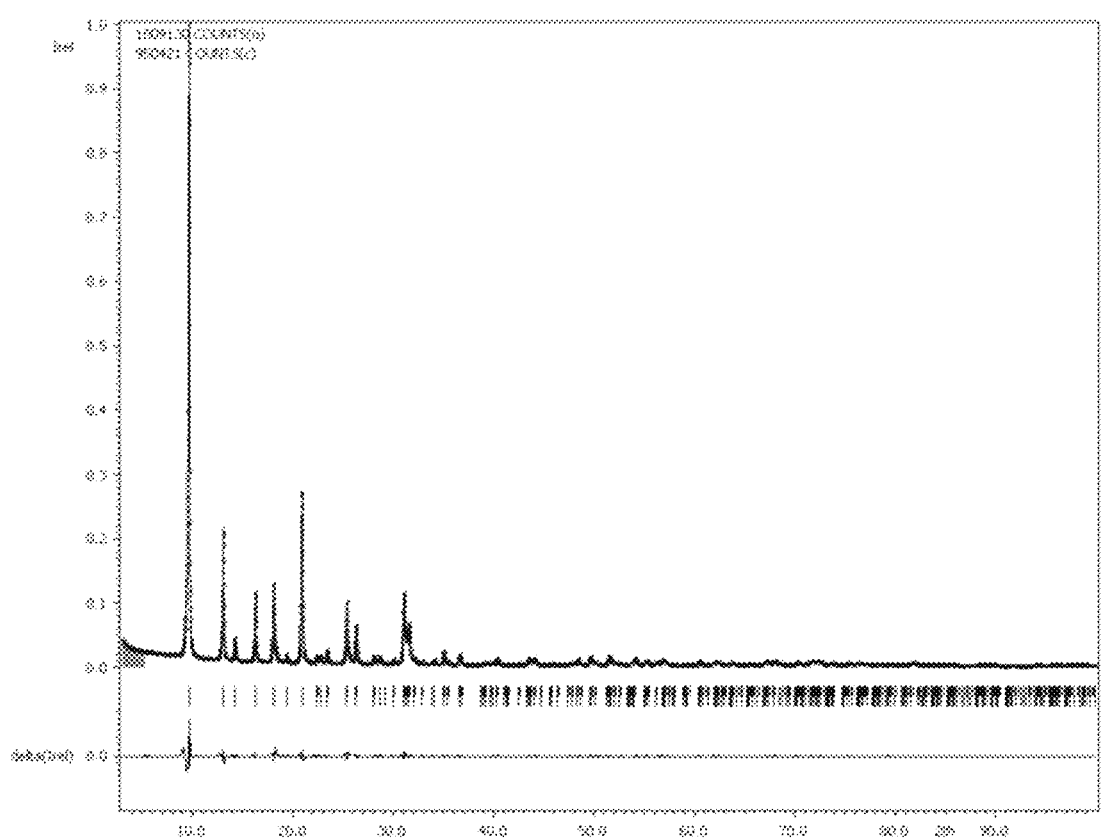
FIG. 15 shows an XRD pattern of C-SSZ-13 seed particles according to an example of the present invention.
Figure 16:
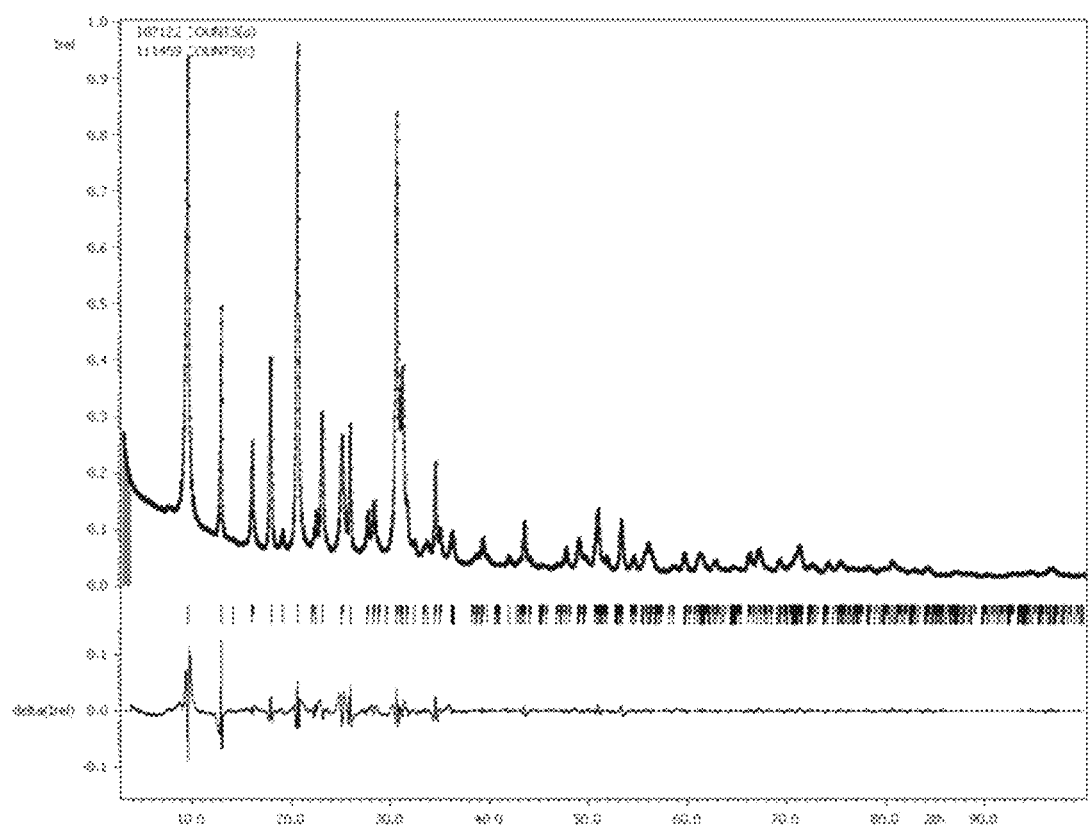
FIG. 16 shows XRD patterns of OSDA-free particles (P_50_1d) according to an example of the present invention.
Figure 17:
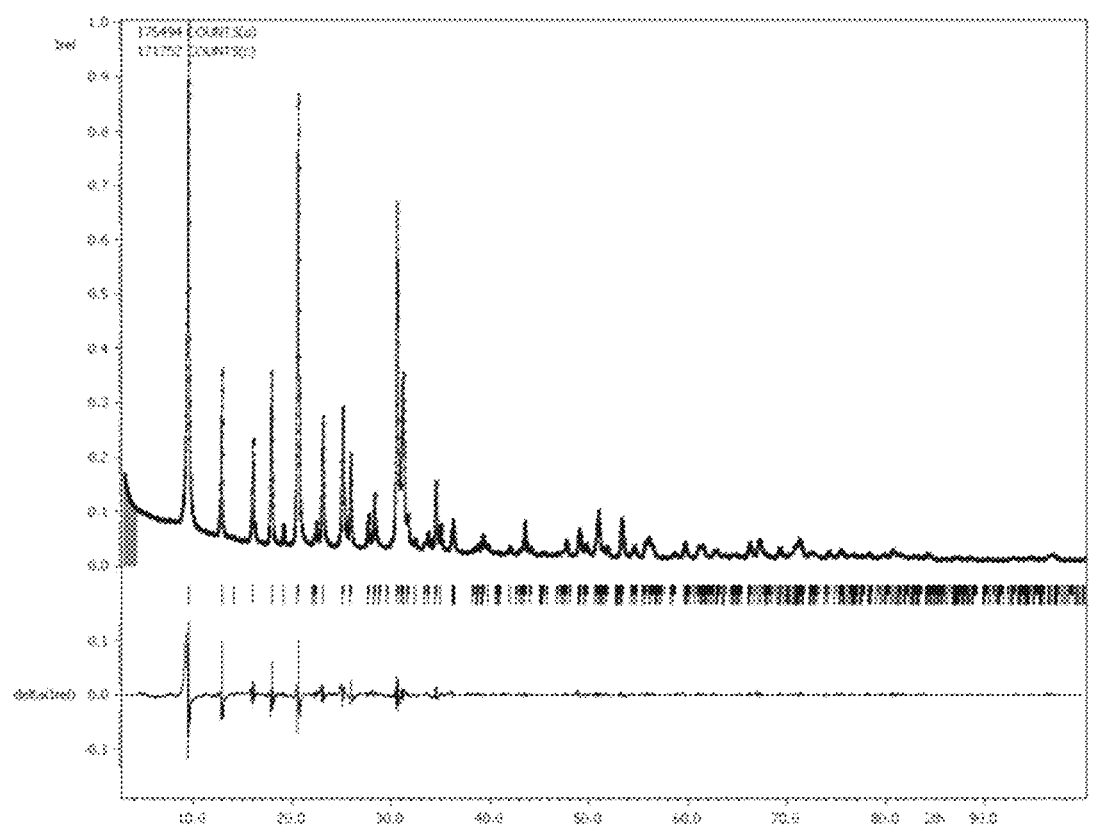
Figure 18:
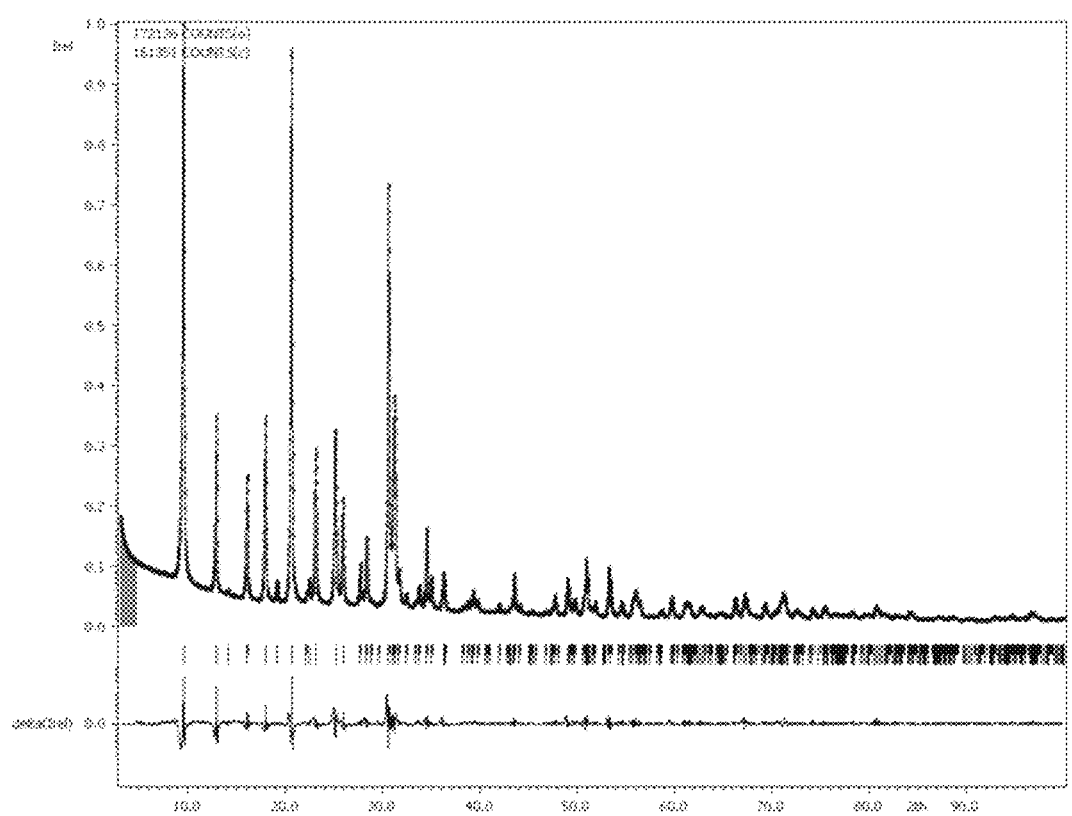

FIG. 14 shows XRD patterns of C-SSZ-13 seed particles and three OSDA-free particles (i.e., P_20_1d, P_20_2d, and P_50_1d). The locations of XRD peaks of C-SSZ-13 parnominal Si/Al ratio of the corresponding synthetic precursors. Instead, the OSDA-free particles were formed with higher Al content (the Si/Al ratios were approximately five times lower than those used for synthesis of the C-SSZ-13 particles). Accordingly, the concentration of cations in the three OSDA-free particles was estimated to be ten times higher than those in the C-SSZ-13 particles, and thus the effective pore size became smaller, resulting in the lower BET surface areas (Table 2). In addition, the insertion of excess cations into the porous structure of the CHA type zeolite was also reflected by the increased lattice parameters (Table 2). This implies that the synthesis of OSDA-free particles that maintain the intrinsic properties of the original SSZ-13 zeolite is quite challenging.

Example 4

Effect of Si/Al Ratio on Formation of OSDA-Free CHA Type Zeolite Membranes

Figure 5:
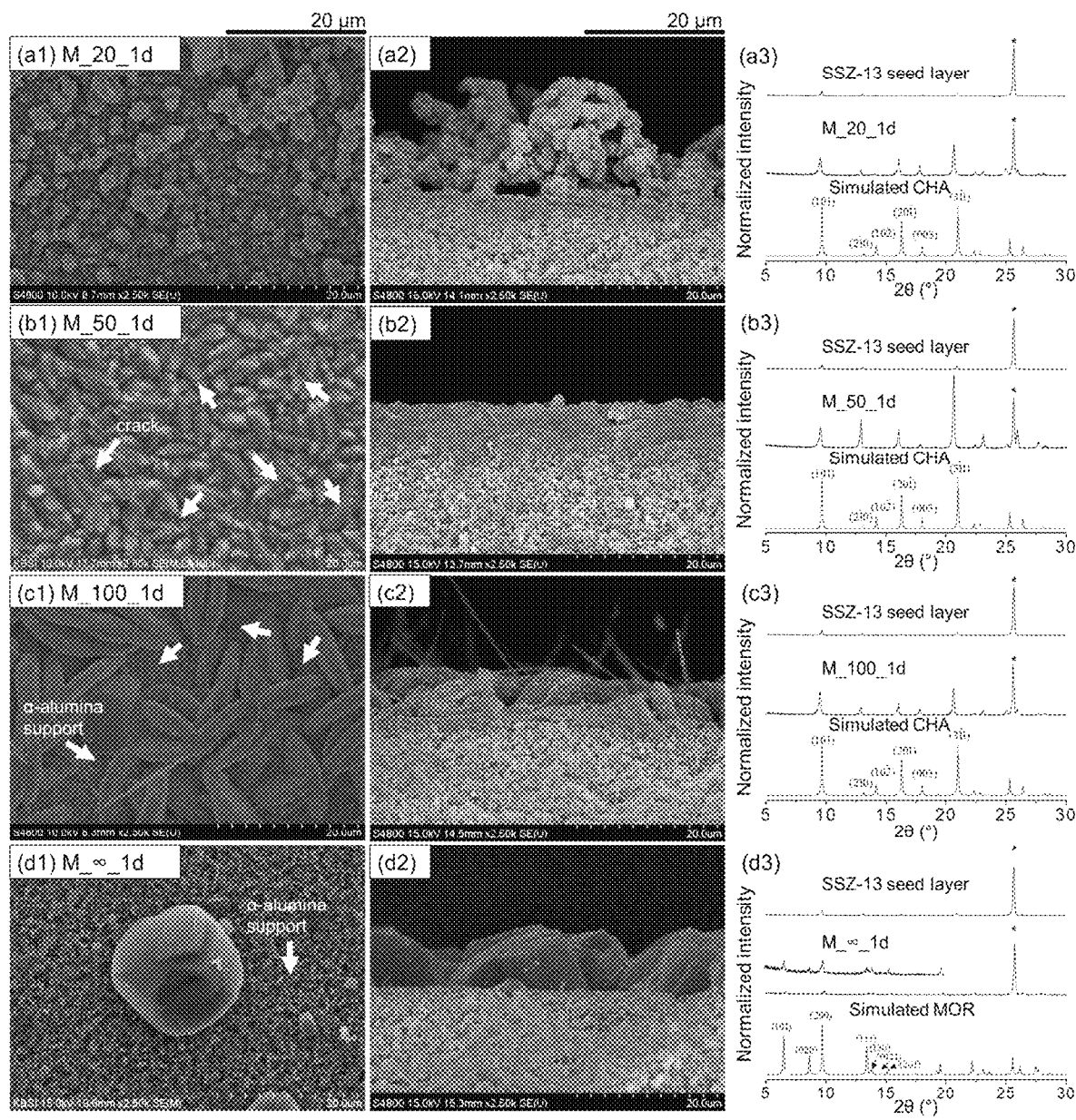
FIG. 5 depicts SEM images and XRD pattern graphs, which show the effect of the Si/Al ratio on the formation of continuous CHA type zeolite membranes according to an example of the present invention.

The selective deposition of SSZ-13 particles with a size of about 700 nm (FIG. 13(a)) on α-alumina supports resulted in the formation of a uniform SSZ-13 seed layer (FIG. 13(b)), which is a pre-requisite for intergrowth to achieve continuous membranes. Among the four nominal Si/Al ratios (20, 50, 100, and ∞) used in the sunthesis of the OSDA-free particles (FIGS. 2 and 3), it was recognized that secondary growth for the formation of a continuous membrane occurred only with the Si/Al ratio of 50, strongly supporting the critical role of the Si/Al ratio during seeded (or secondary) growth (FIG. 5). FIG. 5 shows top-view (left) and cross-sectional-view (middle) SEM images of (a1)-(a2) M_20_1d, (b1)-(b2) M_50_1d, (c1)-(c2) M_100_1d, and (d1)-(d2) M_∞_1d along with (a3)-(d3) the corresponding XRD patterns (right). Yellow arrows indicate the bare alumina region, where the seeded particles were not intergrown during secondary growth. The black scale bars represent 20 μm, and the asterisks (*) indicate the XRD peaks from the α-$Al_2O_3$ disc. Throughout the specification, the terms "seeded" and "secondary growth" are used interchangeably. In the case of M_20_1d, aggregated OSDA-free particles were formed throughout the surface (FIG. 5(a1)) but in a non-continuous way (FIG. 5(a2)). This could possibly be attributed to an overproduction of nuclei, seemingly generated from dissolution of the C-SSZ-13 seed particles under the low Si/Al ratio environment. In the case of M_50_1d, although some cracks were observed in the top-view SEM image (indicated by red arrows in FIG. 5(b1)), at the given SEM resolution, these cracks did not appear to be propagated into the interface between the film and support, as evidenced by the cross-sectional-view SEM image (FIG. 5(b2)). For M_100_1d, long, oval-shaped grains were formed in a non-continuous manner (FIGS. 5(c1) and 5(c2)). Accordingly, the bare α-alumina support was observed, as indicated by yellow arrows. Likewise, isolated thick, disc-like particles were observed in M_∞_1d where the bare α-alumina support was significantly exposed, as indicated by yellow arrows (FIG. 5(d1)). Under the latter two conditions (i.e., the Si/Al ratios of 100 and ∞), where the Al content in the synthetic precursors was apparently insufficient, continuous OSDA-free membranes could not be fabricated after secondary growth. In fact, this trend is consistent with the finding that the use of a lower Al ratio during synthesis of the OSDA-free particles hindered the formation of CHA type zeolite particles (FIGS. 2 and 3). The XRD patterns of the OSDA-free membranes, except for M_∞_1d, confirmed the CHA type zeolite structure (FIG. 5(a3)-5(c3)). In contrast, M_∞_1d included a different phase, namely, the MOR zeolite structure (FIG. 5(d3)), and thus the thick, disc-like particles can be regarded as MOR zeolite grains. This result also indicates that the lower amount of Al facilitated transformation and/or growth of undesired MOR zeolite structures from the C-SSZ-13 seed particles. Therefore, the amount of Al cations, i.e., an appropriate Si/Al ratio, is also a key factor for achieving continuous OSDA-free CHA type zeolite membranes via the secondary growth methodology. From the syntheses using various Si/Al ratios (in FIG. 5), it can be concluded that optimal, but unfortunately narrow-range, conditions are required for the synthesis of well-intergrown OSDA-free CHA type zeolite films; in particular, the conditions used for synthesis for M_50_1d were found to be optimal for the formation of a continuous film.

Example 5

$CO_2/N_2$ Separation Performance of OSDA-Free CHA Membranes

Figure 6:
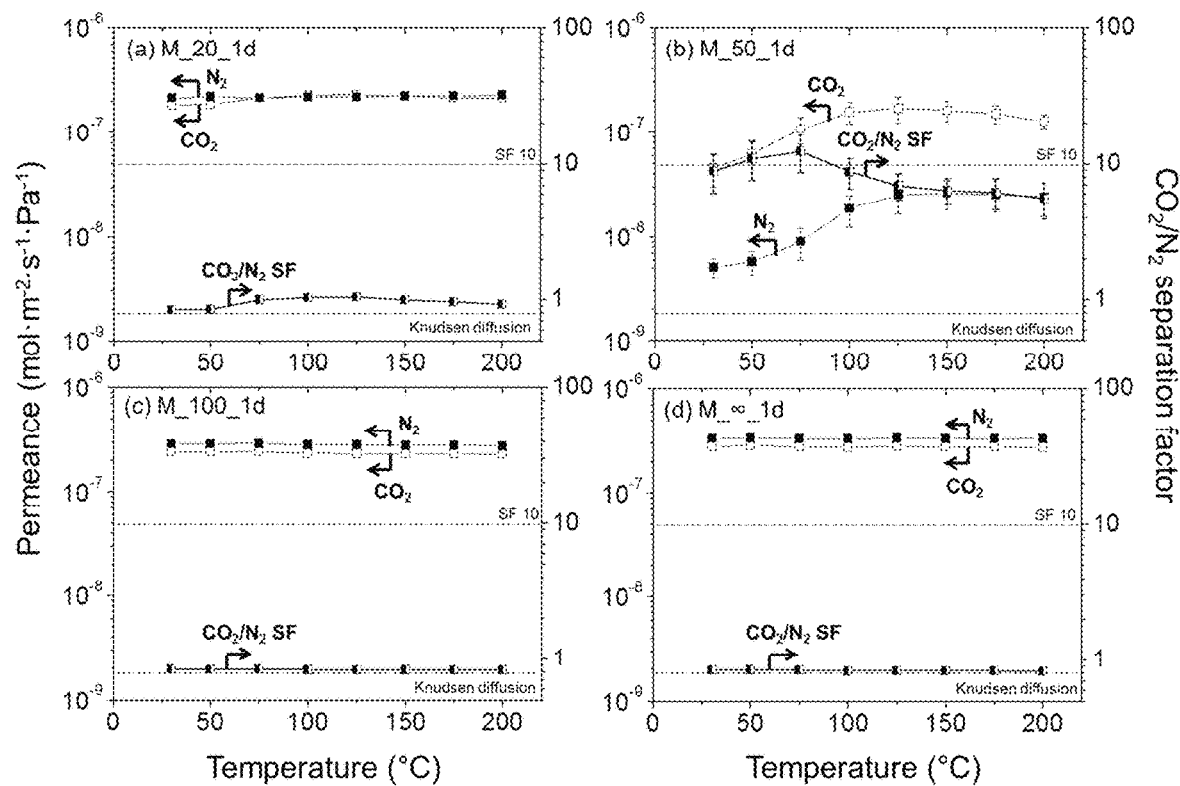
FIG. 6 depicts graphs showing the $CO_2/N_2$ separation performance of continuous CHA type zeolite membranes according to an example of the present invention.

The $CO_2/N_2$ separation performance of the membrane samples shown in FIG. 5 was investigated as a function of the temperature up to about 200° C. under dry conditions (FIG. 6). FIG. 6 shows the $CO_2/N_2$ separation performance of M_x_1d (x=(a) 20, (b) 50, (c) 100, and (d) ∞) as a function of temperature up to 200° C. under dry conditions. In all graphs, gray dashed lines represent a $CO_2/N_2$ SF of about 0.8, determined by the Knudsen diffusion. In addition, the red dashed lines, which represent a $CO_2/N_2$ SF of 10 (ideal selectivity determined from multiplication of permeation selectivity and diffusion selectivity), are included for eye guidance. M_20_1d (FIG. 6(a)) exhibited a maximum (max) $CO_2/N_2$ separation factor (SF) of about 1; considering a $CO_2/N_2$ SF of about 0.8 for the bare α-alumina support based on Knudsen diffusion, this performance can be regarded as extremely poor. In contrast, the max $CO_2/N_2$ SF of M_50_1d was as high as 12.5±3.8 at 75° C. (FIG. 6(b)). Because the max $CO_2/N_2$ SF was estimated to be about 20 by molecular simulation (S. Li et al., Ind. Eng. Chem. Res. 46 (2007) 3904-3911), the separation performance of M_50_1d indicates the feasibility of the template-free CHA membranes. It is noted that the permeance behavior of the $CO_2$ and $N_2$ molecules through M_50_1d was quite unique compared to that through the other CHA type zeolite membranes. In general, CHA type zeolite membranes exhibit a monotonic decrease of both the $CO_2$ permeance and the corresponding $CO_2/N_2$ SF with increasing temperature under dry conditions, as adsorption-based separation is likely to be dominant (N. Kosinov et al., J. Mater. Chem. A 2 (2014) 13083-13092; X. Gu et al., Ind. Eng. Chem. Res. 44 (2005) 937-944). In contrast, the max $CO_2/N_2$ SF for M_50_1d was observed at 75° C., while the $CO_2$ permeance increased monotonically from 30 to 100° C. This may be because the effective pore size of the OSDA-free CHA type zeolite was smaller than that of the C-SSZ-13 particles (FIG. 4). The additional increase in the nominal Si/Al ratio did not allow for the formation of a continuous membrane in the case of M_100_1d and M_∞_1d (FIG. 5(c1)-5(d1)), and thus neither membranes exhibited any separation ability for the $CO_2/N_2$ mixtures (FIG. 6(c)-6(d)). The $N_2$ molecules, which are lighter than $CO_2$ ($N_2$ molecular weight (28) vs. $CO_2$ molecular weight (44)), could permeate both membranes faster with a corresponding $CO_2/N_2$ SF of ~0.8, indicative of dominant Knudsen diffusion.

Example 6

Effect of Hydrothermal Reaction Time on Formation of Continuous Membranes

Using the nominal Si/Al ratio of 50, the present inventors examined the effect of hydrothermal reaction times 0.5 days, 1.5 days and 2 days), since M_50_1d showed marked $CO_2/N_2$ separation performance (FIG. 6(b)). FIG. 6 shows SEM images of M_50_xd (x=(a) 0.5, (b) 1, (c) 1.5, and (d) 2) along with (e) their XRD patterns as well as the simulated XRD pattern of all-silica CHA type zeolite. Red arrows indicate some observed cracks. The black scale bars represent 10 μm, and the asterisks (*) indicate the XRD peak from the α-Al$_2$O$_3$ disc. For fair comparison, the intensity of the XRD peak corresponding to the α-Al$_2$O$_3$ disc was used to normalize the XRD patterns of the membrane samples.

Figure 7:
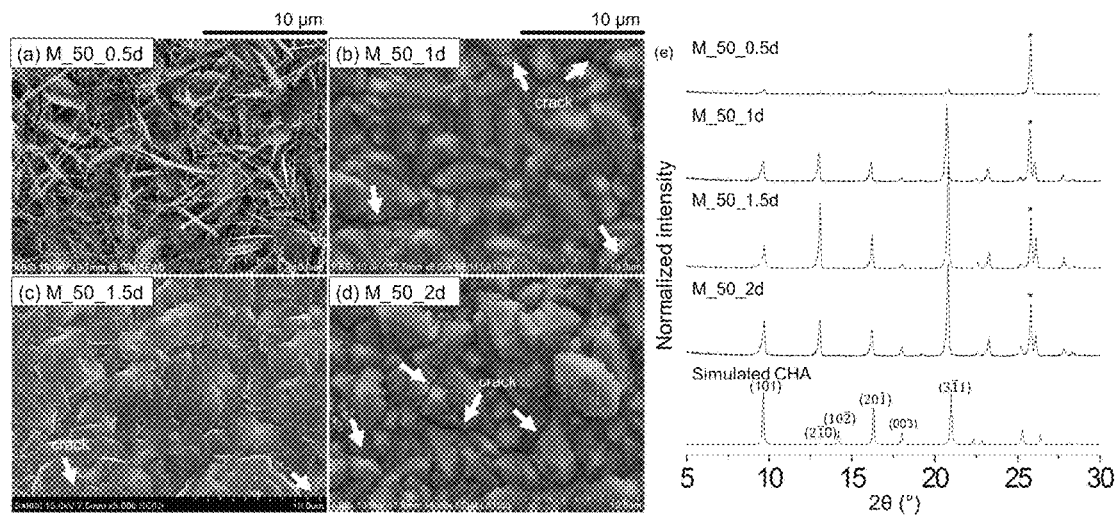
FIG. 7 depicts SEM images and XRD pattern graphs, which show the effect of hydrothermal reaction time on the formation of continuous CHA type zeolite membranes according to an example of the present invention.

The longer durations of 1.5 days and 2 days also resulted in the synthesis of continuous membranes with surface morphologies that were almost identical to that of M_50_1d (FIG. 7(b)-7(d)). However, the shorter duration of 0.5 days was not sufficient to complete the intergrowth of the seed particles, leading to the co-existence of string- and plate-like particles on the top surface (FIG. 7(a)). It appears that the plate-like particles were initially formed, along with a majority of string-like particles (FIG. 6(a)); further intergrowth formed continuous membranes (FIG. 7(b)-7(d)). Intriguingly, the string-like particles were observed irrespective of the secondary growth time (FIG. 7(a)-7(d)). In addition, some cracks, indicated by red arrows in FIG. 7(c)-7(d), were also found for M_50_xd (x=1.5 and 2). The corresponding XRD patterns shown in FIG. 7(e) confirm that all membranes obtained after secondary growth for 1-2 days had the pure CHA type zeolite structure with a minor left-shift of the XRD peaks, as previously observed in the XRD patterns of OSDA-free particles (FIG. 3 and Table 2).

Figure 8:
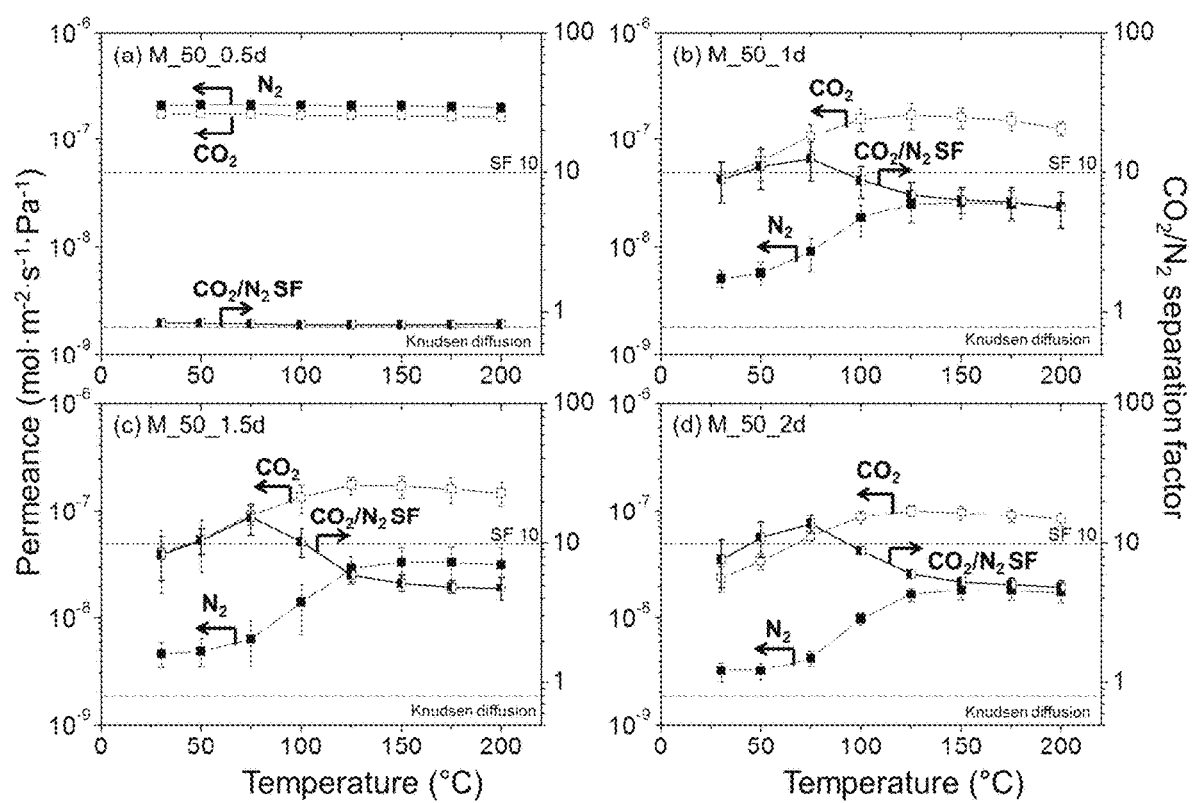
FIG. 8 depicts graphs which show the $CO_2/N_2$ separation performance of continuous CHA type zeolite membranes according to an example of the present invention.

Furthermore, the CO$_2$/N$_2$ separation performance of the series of samples obtained at different secondary growth times (M_50_xd; x=0.5, 1.5, and 2) was evaluated under dry conditions (FIG. 8). FIG. 8 shows CO$_2$/N$_2$ separation performance for M_50_xd (x=(a) 0.5 (b) 1, (c) 1.5, and (d) 2) under dry conditions. In all graphs, the gray dashed lines represent a CO$_2$/N$_2$ SF of about 0.8, determined from Knudsen diffusion, and red dashed lines, which represent a CO$_2$/N$_2$ SF of 10 (the ideal permeation selectivity determined from multiplication of the sorption selectivity and the diffusion selectivity), are included for eye guidance.

Figure 19:
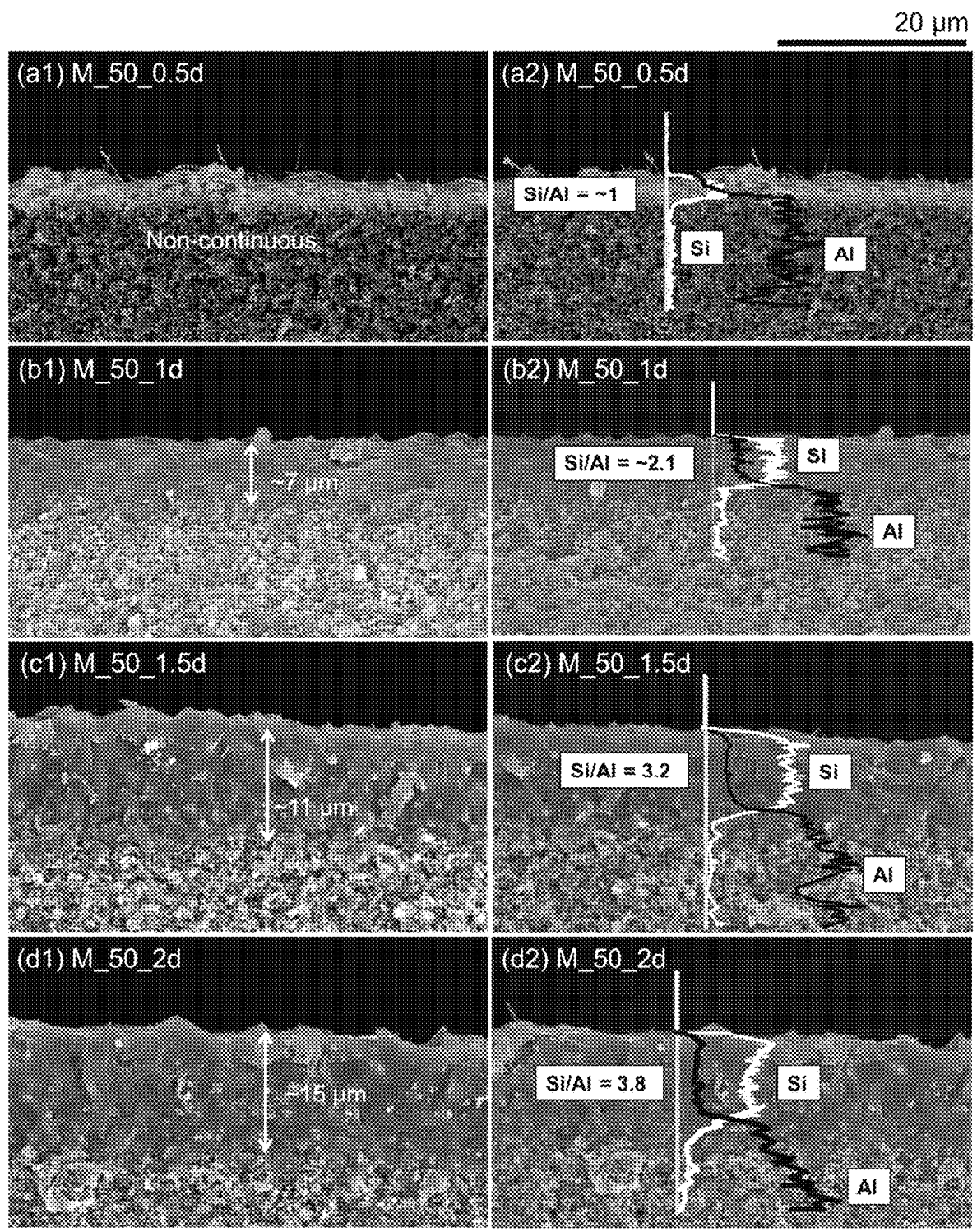
FIG. 19 shows cross-sectional SEM images and EDX-based Si and Al profiles of continuous CHA type zeolite membranes according to an example of the present invention.

As expected from the similarity of the morphologies in the top-view SEM images (FIG. 7(b)-7(d)), the CO$_2$/N$_2$ separation performance of M_50_1.5d and M_50_2d were comparable to that of M_50_1d with the minor difference being the decreased permeance of CO$_2$ and N$_2$ molecules through the membranes. The reduction in the permeance observed in FIG. 8(b)-8(d) can be associated with the thicker membrane obtained with the increased synthesis time (FIG. 19). FIG. 19 shows cross-sectional-view SEM images and EDX-based Si and Al profiles of M_50_xd (x=(a1)-(a2) 0.5, (b1)-(b2) 1, (c1)-(c2) 1.5, and (d1)-(d2) 2). In (a1)-(d1) of FIG. 19, the estimated membrane thicknesses are given, and in (a2)-(d2), the Si and Al profiles were obtained along with the yellow lines.

Along with the SEM characterization (FIG. 7(a)), the constant CO$_2$/N$_2$ SF of about 0.8 for M_50_0.5d over the evaluated temperature range up to 200° C. also supports the incomplete intergrowth of the seed layer (FIG. 8(a)). From these multiple attempts, the present inventors could conclude that the secondary growth of the SSZ-13 seed layer with a synthetic precursor (with a nominal Si/Al ratio of about 50) for the duration of about 1 day is optimal for the fabrication of high-quality OSDA-free CHA membranes in a reproducible manner. Notably, synthesis of the OSDA-free CHA membranes requires a duration of about 1-1.5 days, which is comparable to about 2 days needed to acquire conventional SSZ-13 membranes using TMAdaOH as an OSDA (Y. Zheng et al., J. Membr. Sci. 475 (2015) 303-310). Despite the drawback that the smaller effective pore size of the template- or OSDA-free zeolite membranes results in lowered permeance (M. Pan et al., Microporous Mesoporous Mater. 43 (2001) 319-327), this simpler process based on template-free secondary growth is considerably beneficial for the realization of large-scale zeolite membrane manufacturing.

Example 7

Elucidation of Non-Zeolitic, Defective Structures

The present inventors investigated the structure of defects such as cracks and grain-boundary defects in the high-performance OSDA- or template-free membranes (here, M_50_1d) by using FCOM analysis.

FIG. 9(a)-9(e) show cross-sectional-view FCOM images of M_50_1d, and FIG. 9(f)-9(g) show top-view FCOM images of M_50_1d. The top-view FCOM images of FIG. 9(f)-9(g) were acquired from portions indicated by a yellow line of FIG. 9(a)-9(e). The cross-sectional-view FCOM images of FIG. 9(a)-9(e) were acquired from portions indicated by five yellowish green dashed lines of FIG. 9(f)-9(g).

Figure 9:
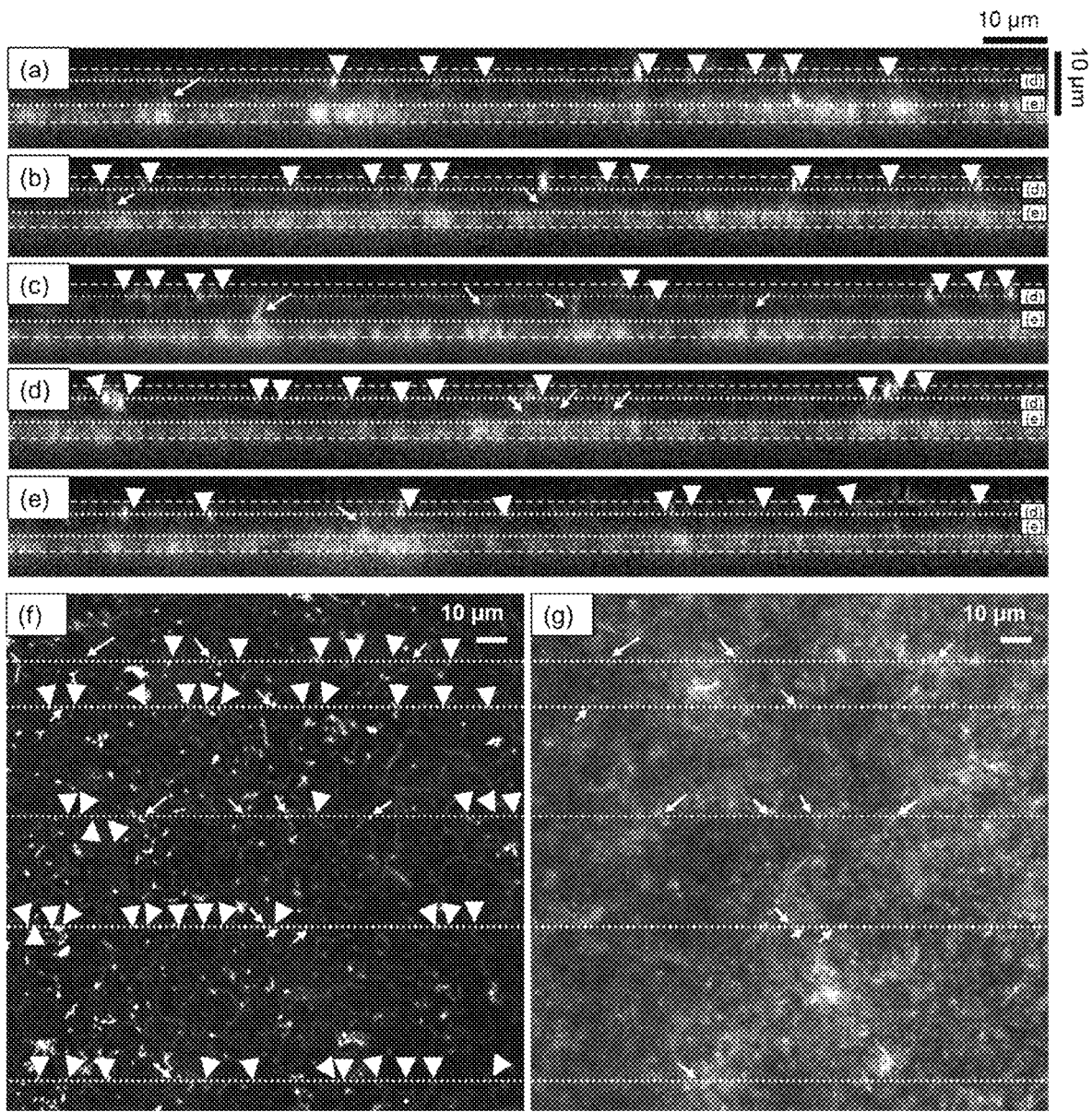
FIG. 9 depicts FCOM images of continuous CHA type zeolite membranes according to an example of the present invention.
Figure 20:
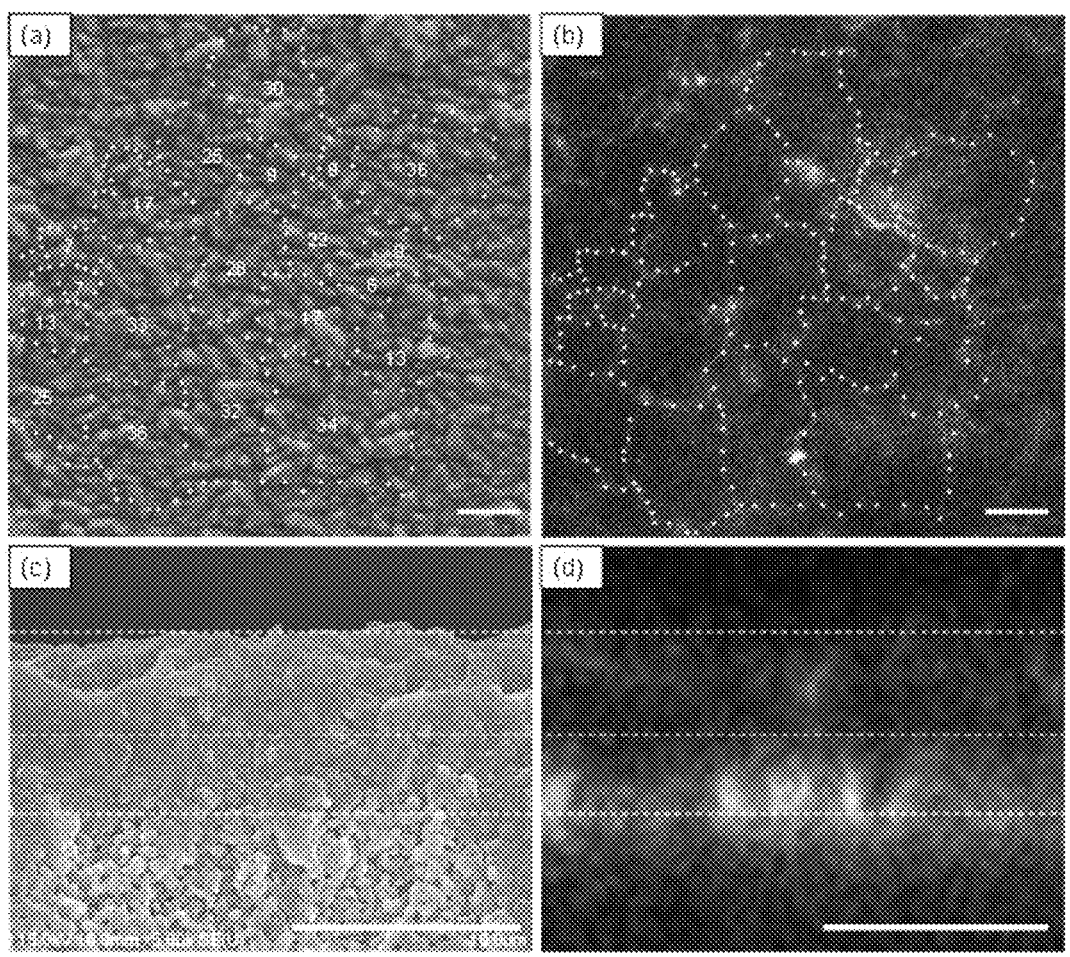
FIG. 20 shows SEM and FCOM images of continuous CHA type zeolite membranes according to an example of the present invention.

Despite the lack of a calcination step, M_50_1d obviously had defects, mainly cracks, throughout the membrane surface as shown in FIG. 9, implying that the formation of defects could not be avoided. This suggests that the formation of defects was presumably due to insufficient intergrowth among the polycrystalline grains during the hydrothermal secondary growth (Z. Chen et al., J. Membr. Sci. 369 (2011) 506-513). The cross-sectional-view FCOM images reveal that two types of defects were present; (1) one type defect that propagated fully down to the interface between M_50_1d and the α-alumina support; and (2) the other type defect that existed near the surface, as respectively indicated by yellow and red arrows in FIG. 9. Although the defects that propagated fully down to the interface would deteriorate the membrane separation performance, the density of these defects was significantly lower than that of the defects present near the surface (indicated by the smaller number of yellow arrows in FIG. 9) and almost comparable to that in the high CO$_2$ perm-selective DDR membrane (E. Kim et al., J. Mater. Chem. A 5 (2017) 11246-11254). Further analysis showed that most of the defect-free portions seemingly consisted of about 10-40 grains, as estimated from FIG. 20(a)-20(b). Desirably, almost no grain-boundary defects were observed around the individual grains in M_50_1d, as compared to the ~10-30 μm thick MFI type zeolite membrane, which showed poor molecular sieving ability (M. A. Snyder et al., Microporous Mesoporous Mater. 76 (2004) 29-33). Moreover, the OSDA-free synthetic protocol allowed for the formation of well-intergrown membrane constituents (FIG. 30(c)-30(d)). In combination, these features indicate that the approach employing OSDA-free secondary growth is effective for avoiding the considerable generation of defects that serve as non-selective pathways along the membrane thickness. Thus, a continuous CHA membrane (here, M_50_1d) with good performance was obtained via the OSDA-free secondary growth method (FIG. 5(b1)-5(b3)), which should afford good-quality molecular sieving (FIG. 6(b)) primarily through the dominant zeolitic part.

Example 8

CO$_2$/N$_2$ and CO$_2$/CH$_4$ Separation Performances

Figure 10:
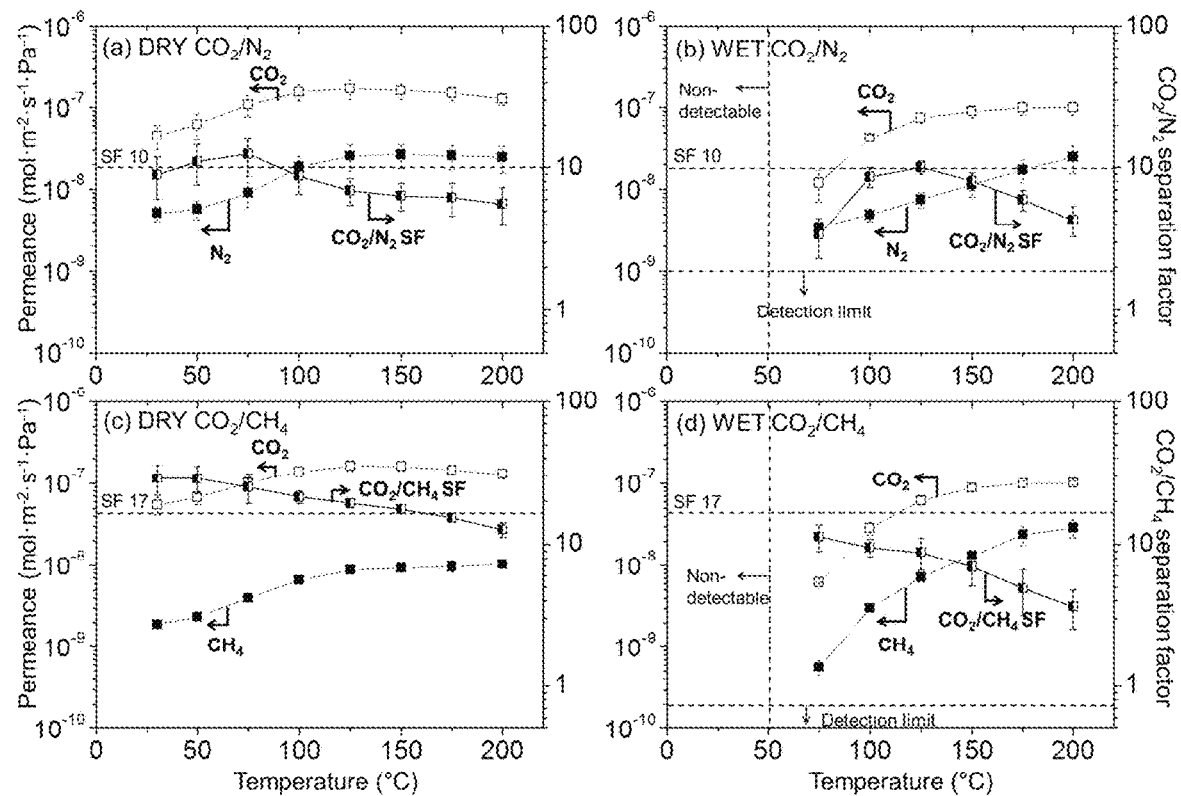
FIG. 10 depicts graphs showing the $CO_2/N_2$ separation performance of continuous CHA type zeolite membranes according to an example of the present invention.

Encouraged by the high CO$_2$/N$_2$ separation performance, the present inventors further examined the CO$_2$/N$_2$ separation performance of M_50_1d under wet conditions (FIG. 10(b)), as H$_2$O vapor is the 3$^{rd}$ largest component in the flue gas stream generated from fossil fuel-fired power plants (D. M. D'Alessandro et al., Angew. Chem.-Int. Edit. 49 (2010) 6058-6082). FIG. 10 shows the $CO_2/N_2$ (upper; (a)-(b)) and $CO_2/CH_4$ (lower; (c)-(d)) separation performance of M_50_1d under dry (left) and wet (right) conditions as a function of temperature up to 200° C. Red dashed lines, which represent the $CO_2/N_2$ SF of 10 in (a)-(b) and $CO_2/CH_4$ SF of 17 in (c)-(d) (the ideal permeation selectivities determined from multiplication of the sorption selectivity and the diffusion selectivity), are included for eye guidance. Under wet conditions, no permeation of $CO_2$, $N_2$, and $CH_4$ molecules could be detected (below the dark pink dashed line; detection limit) at the temperature lower than and equal to 50° C. (left side of the blue dashed line) in (b) and (d).

Considering that the removal of $H_2O$ vapor prior to membrane-based separation is energy-intensive (M. T. Snider et al., Microporous Mesoporous Mater. 192 (2014) 3-7), robust $CO_2$-selective separation capacity of zeolite membranes, especially at about 50 to 75° C., is highly desirable. At moderate temperatures of 30 to 50° C., no permeation through M_50_1d was detectable at the limit of the TCD detector (estimated to be as low as about $1 \times 10^{-9}$ mol·m$^{-2}$·s$^{-1}$·Pa$^{-1}$), mainly due to strong inhibition by $H_2O$ vapor. Because of the prominent hydrophilic portion of M_50_1d, as supported by the EDX data in FIG. 19(b2), $H_2O$ vapor was preferentially adsorbed inside the CHA type zeolite and reduced the effective pore size, similar to the permeation behavior of NaY membranes under wet conditions (X. Gu et al., Ind. Eng. Chem. Res. 44 (2005) 937-944). Despite the negligible permeances up to about 50° C., above 75° C., the capacity to separate $CO_2/N_2$ mixtures for WET $CO_2/N_2$ was recovered as the affinity for $H_2O$ adsorption was weakened. Notably, the max $CO_2/N_2$ SF of M_50_1d was as high as 10.0±1.0 at 125° C. with a corresponding $CO_2$ permeance of $7.5 \times 10^{-8}$ mol·m$^{-2}$·s$^{-1}$·Pa$^{-1}$. Although the OSDA-free membrane would not be useful at low temperatures such as flue gas temperatures, this membrane can still be applied to $CO_2$ separation under high temperature and wet feed conditions (R. Bredesen et al., Chem. Eng. Process. 43 (2004) 1129-1158; M. Ostwal et al., J. Membr. Sci. 369 (2011) 139-147). In fact, the representative temperature range of about 50 to 75° C. for the flue gas stream originates from the desulfurization process, which usually requires copious amounts of water for cooling (H. Zhai et al., Environ. Sci. Technol. 45 (2011) 2479-2485). Therefore, the $CO_2$ perm-selective membrane (M_50_1d) can potentially be applied to $CO_2/N_2$ separation at higher temperatures (up to 150° C. as shown in FIG. 10(b)) prior to the desulfurization process.

In addition to the good $CO_2/N_2$ separation performance, M_50_1d showed a max $CO_2/CH_4$ SF as high as 28.8±6.9 at 30° C. under DRY $CO_2/CH_4$ (FIG. 10(c)). This value is larger than the max $CO_2/N_2$ SF (12.5), apparently due to the larger molecular size of $CH_4$ (0.38 nm) relative to that of $N_2$ (0.364 nm). Although the permeance of $CO_2$ would be more strongly inhibited by the larger $CH_4$, the present inventors found that for the $CO_2/N_2$ (FIG. 10(a)) and $CO_2/CH_4$ mixtures (FIG. 10(c)), the permeance of $CO_2$ through the membrane was comparable, indicating the weak interaction of $CO_2$ with $CH_4$. However, it was noted that the $CO_2$ permeance under WET $CO_2/CH_4$ was lower than that under WET $CO_2/N_2$, indicating that $CO_2$ molecules are obviously more strongly inhibited by the larger $CH_4$ molecules in the presence of $H_2O$, as evident from FIG. 9(c)-9(d). As observed from the wet $CO_2/N_2$ permeation test, no permeance of $CO_2$ and $CH_4$ molecules was detected below 50° C. under wet conditions (the corresponding detection limit was approximated as $2 \times 10^{-10}$ mol·m$^{-2}$·s$^{-1}$·Pa$^{-1}$). Nevertheless, both molecules permeated the membrane above 75° C. (FIG. 10(d)). For WET $CO_2/CH_4$, the max $CO_2/CH_4$ SF and $CO_2$ permeance were 11.3±2.4 and $6.2 \times 10^{-9}$ mol·m$^{-2}$·s$^{-1}$·Pa$^{-1}$ at 75° C., respectively. Considering the representative temperature of about 40 to 70° C. and water content of 3 to 6 vol % in the biogas stream (E. Favre et al., J. Membr. Sci. 328 (2009) 11-14), a slight increase of the feed temperature (for example, to 100-125° C.) is needed to secure modest $CO_2$ permeance ($6.2 \times 10^{-8}$ mol·m$^{-2}$·s$^{-1}$·Pa$^{-1}$ at 125° C.) with a marked $CO_2/CH_4$ SF (8.8) under wet conditions.

Comparison of Separation Performance with Literature Data

Figure 11:
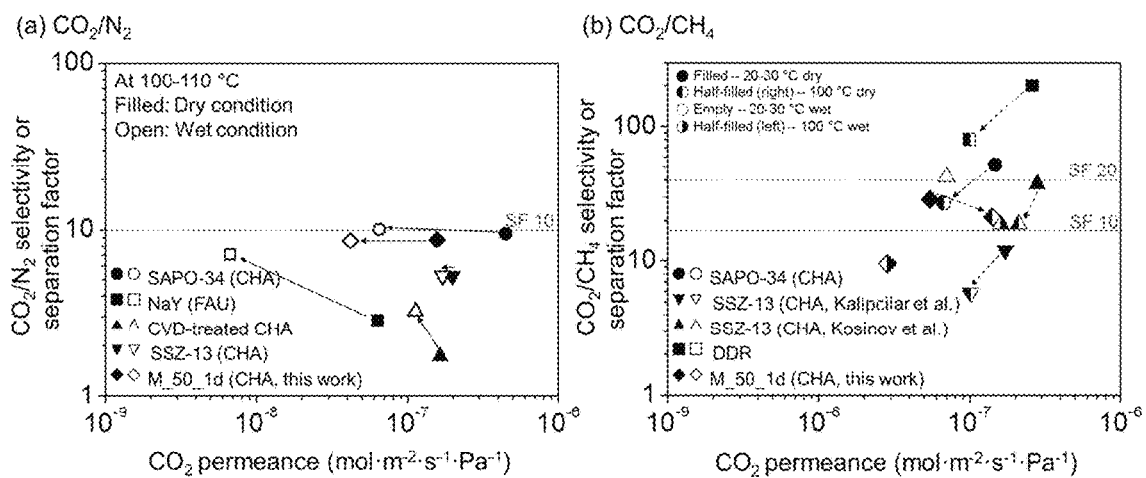
FIG. 11 depicts graphs showing a comparison of the $CO_2/N_2$ separation performance of continuous CHA type zeolite membranes according to an example of the present invention with literature data.

FIG. 11(a) shows $CO_2/N_2$ separation factor or selectivity vs. $CO_2$ permeance for M_50_1d along with that of other zeolite membranes (SAPO-34, NaY, CVD-treated CHA, and SSZ-13) under both dry and wet conditions at 100-110° C. FIG. 11(b) shows the $CO_2/CH_4$ SF vs. $CO_2$ permeance of M_50_1d along with those of other zeolite membranes (SAPO-34, SSZ-13, DDR); permeation tests were conducted at 20-30° C. and 100° C. under dry and wet conditions. In (a), the red dashed line, which represents a $CO_2/N_2$ SF of 10, is included for eye guidance, while in (b), the red dashed lines represent $CO_2/CH_4$ SFs of 10 and 20. In (a), the solid arrows indicate the change in the separation performance from those under dry conditions to those under wet conditions. In (b), the dashed arrows indicate the temperatures during separation performance measurement from low (20-30° C.) to high (100° C.).

FIG. 11(a) presents a comparison of the $CO_2/N_2$ separation performance of M_50_1d with those of documented zeolite membranes under both dry and wet conditions. In coal-fired power plants, the operation spans a wide temperature range from the coal-fired boiler temperature (about 1100-1600° C.) to the stack gas temperature (about 50-75° C.) (R. Quinn et al., Ind. Eng. Chem. Res. 51 (2012) 9320-9327). Herein, the membrane performance was evaluated in the range of 100 to 110° C., which corresponds to that expected prior to the flue gas desulfurization process. As mentioned above, at the selected temperatures, M_50_1d showed marked $CO_2$ perm-selectivity under WET $CO_2/N_2$. In this temperature range, FAU (X. Gu et al., Ind. Eng. Chem. Res. 44 (2005) 937-944) and CVD-treated CHA (E. Kim et al., Environ. Sci. Technol. 48 (2014) 14828-14836) zeolite membranes had a trade-off between the separation performance under dry and wet conditions, exhibiting high $CO_2$ permeance and low $CO_2/N_2$ SF under dry conditions vs. low $CO_2$ permeance and high $CO_2/N_2$ SF under wet conditions. This suggests that at the high temperature of about 100° C., $H_2O$ molecules could still be adsorbed in the membranes and hamper the permeation of $CO_2$. More importantly, the permeance of the larger $N_2$ molecule was further decreased, mainly due to inhibition by the adsorbed $H_2O$ molecules. This difference in the degree of inhibition by the adsorbed $H_2O$ molecules led to an increase in the $CO_2/N_2$ SF under wet conditions. In contrast, M_50_1d, as well as SAPO-34 (S. Li et al., Ind. Eng. Chem. Res. 49 (2010) 4399-4404) and SSZ-13 (N. Kosinov et al., J. Mater. Chem. A 2 (2014) 13083-13092) membranes, exhibited different permeation behavior, in which the $CO_2/N_2$ SFs were comparable under both dry and wet conditions, whereas under wet conditions, the $CO_2$ and $N_2$ permeance both decreased to a similar extent relative to the corresponding values under dry conditions. The fact that the $CO_2/N_2$ SF (about 8.8) of M_50_1d at about 100° C. under dry conditions was almost twice as large as those of the FAU and CVD-treated CHA type zeolite membranes suggests a lower degree of non-zeolitic defects. Notably, the $CO_2/N_2$ separation performance of M_50_1d was comparable to that of the SAPO-34 membrane obtained by using TEAOH and dipropylamine as OSDAs (S. Li et al., Ind. Eng. Chem. Res. 49 (2010) 4399-4404), making it promising for practical use under harsh conditions.

The present inventors further compared the $CO_2/CH_4$ separation performance of M_50_1d with those of other membranes (SSZ-13 (H. Kalipcilar et al., Chem. Mater. 14 (2002) 3458-3464; N. Kosinov et al., J. Mater. Chem. A 2 (2014) 13083-13092), DDR(S. Himeno et al., Ind. Eng. Chem. Res. 46 (2007) 6989-6997), and SSZ-13 membranes (S. Li et al., J. Membr. Sci. 241 (2004) 121-135)) (FIG. 11(b)). For FIG. 11(b), the present inventors considered the $CO_2/CH_4$ separation performance at 20-30° C. and 100° C. It was noted that both M_50_1d and other CHA and DDR membranes showed good $CO_2/CH_4$ separation performance under dry conditions. When the feed temperature was increased from 20-30° C. to 100° C., the $CO_2/CH_4$ SF and the $CO_2$ permeance of the SSZ-13, SAPO-34, and DDR membranes concomitantly decreased; specifically, the $CO_2/CH_4$ SFs were decreased by almost half. On the contrary, M_50_1d showed a different behavior, whereby the $CO_2$ permeance increased without any noticeable degradation of the $CO_2/CH_4$ SF.

The $CO_2/CH_4$ separation performance of M_50_1d under the wet condition was inferior to that of the other SSZ-13 membrane at about 100° C., mainly because of the above-mentioned significant hindrance by the adsorbed $H_2O$ molecules. The degree of degradation of the membrane performance under WET $CO_2/CH_4$ was much higher for M_50_1d, for which the Si/Al ratio was presumably lower than that of others. Nevertheless, at the higher temperature of 100° C., where the adsorption of $H_2O$ molecules is weakened, the membrane exhibited good separation performance under WET $CO_2/CH_4$ with a $CO_2/CH_4$ SF as high as about 10 at 100° C. To be attractive for large-scale use, the reduced $CO_2$ permeance of M_50_1 under WET $CO_2/CH_4$ could be increased by adopting high-flux, asymmetric supports (J. Hedlund et al., Microporous Mesoporous Mater. 52 (2002) 179-189).

Figure 21:
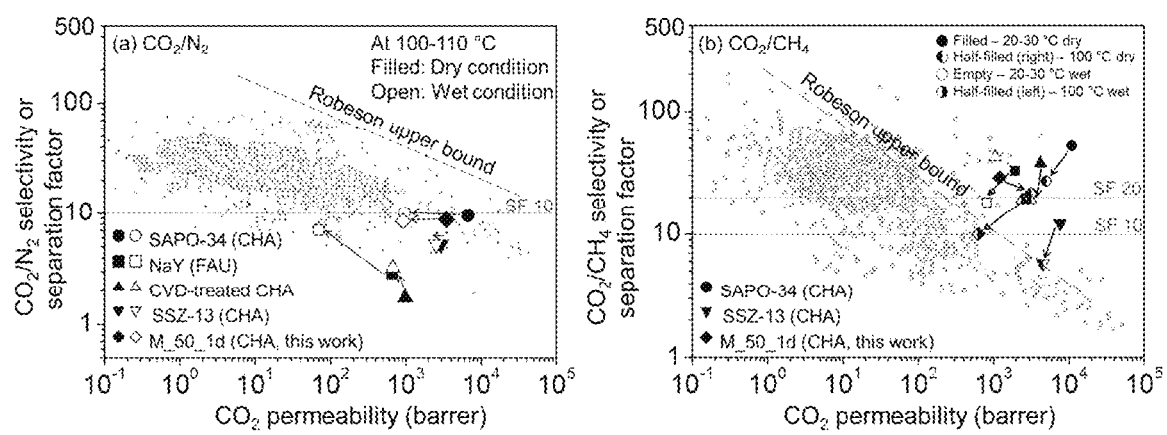
FIG. 21 depicts graphs showing a comparison of the performance of a continuous CHA type zeolite membrane of the present invention with those of conventional membranes.

In addition, the performance was compared with those of conventional membranes by use of the Robeson upper bound as shown in FIG. 21. The membrane according to the presaent invention showed high $CO_2$ permeability and high separation factor even in the presence of $CO_2/N_2$, and showed separation performance above the Robeson upper bound even in the presence of $CO_2/CH_4$.

Example 9

Long-Term Stability of OSDA-Free CHA Membranes

Figure 12:
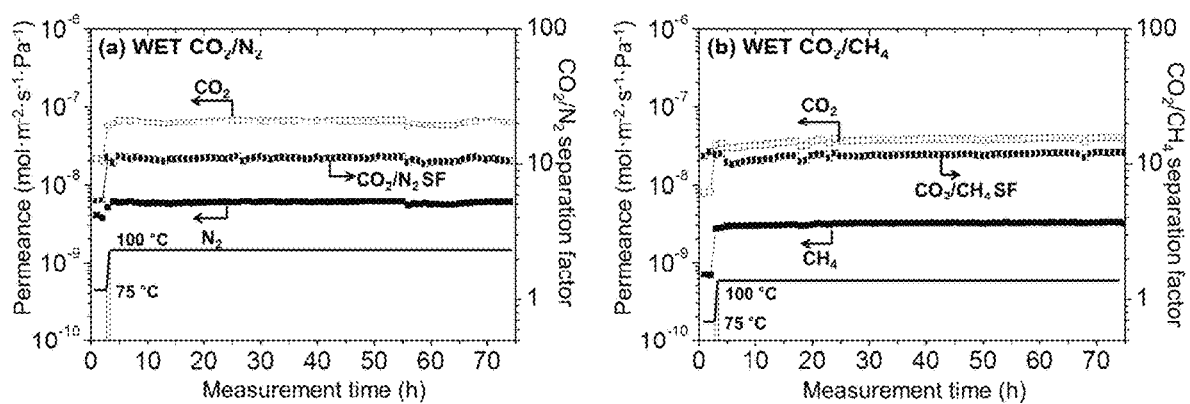
FIG. 12 depicts graphs showing stability of continuous CHA type zeolite membranes according to an example of the present invention.

The long-term stability of M_50_1d was evaluated at 100° C. under the wet condition for a sufficiently long duration (3 days) under laboratory settings (FIG. 12(a)) to ensure its robust use of $CO_2/N_2$ separation. FIG. 12 shows the results of evaluating the long-term stability of M_50_1d for the separation of (a) $CO_2/N_2$ and (b) $CO_2/CH_4$ binary mixtures under the wet condition at 100° C. for 72 hours.

During the continuous measurements, the $CO_2/N_2$ separation performance was well maintained without any pronounced degradation, suggesting preservation of the structural integrity of the CHA type zeolite in the presence of $H_2O$. Specifically, the average $CO_2/N_2$ SF at 100° C. was 10.9±0.3 and the average $CO_2$ permeance was $6.3\times10^{-8}$ $mol\cdot m^{-2}\cdot s^{-1}\cdot Pa^{-1}$. Furthermore, a long-term stability test of M_50_1d up to 3 days, carried out in order to evaluate the reliability of the $CO_2/CH_4$ separation ability at 100° C. under the wet condition, did not indicate any significant degradation, also supporting the high structural robustness of M_50_1d (FIG. 12(b)). Here, the present inventors emphasize that the high long-term stability of M_50_1d supports the effectiveness of the approach based on the template- or OSDA-free secondary growth as observed for other membranes that showed stabilities for water/ethanol separation (Y. Hasegawa et al., J. Membr. Sci. 347 (2010) 193-196; R. Zhou et al., Microporous Mesoporous Mater. 179 (2013) 128-135) and $CO_2/CH_4$ separation (H. Shi et al., RSC Adv. 5 (2015) 38330-38333).

INDUSTRIAL APPLICABILITY

According to the present invention, when membranes are synthesized using CHA type zeolite particles suitable for carbon dioxide separation without using organic structure directing agents, CHA type zeolite membranes can be fabricated in a cost-effective manner without a calcination process using an inexpensive alkali metal hydroxide instead of an organic structure directing agent.

In addition, CHA type zeolite membranes can be synthesized without using an organic structure directing agent depending on optimal synthesis conditions according to various synthesis conditions and reaction times. The CHA type zeolite membrane free of an organic structure directing agent, synthesized under the optimal synthesis conditions, has an effect of exhibiting $CO_2/N_2$ and $CO_2/CH_4$ separation performances similar to those of conventional CHA separation membranes.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of fabricating an organic structure directing agent-free CHA type zeolite membrane, comprising:
   (a) preparing particles having a CHA structure,
   (b) forming a seed layer by depositing the particles having the CHA structure on a support; and
   (c) fabricating a CHA type zeolite membrane by conducting hydrothermal synthesis on the seed layer using a synthetic precursor solution containing an alkali metal hydroxide and silica, and having a molar ratio of Si to Al of 45-55 at a temperature of 100-250° C. for 24-48 hours,
   wherein the organic structure directing agent is added to step (a), and is not added to steps (b) and (c).

2. The method of claim 1, wherein an alkali metal in the alkali metal hydroxide is selected from the group consisting of Li, Na, K and mixtures thereof.

3. The method of claim 1, further comprising a step of drying after hydrothermally synthesizing in step of (c).

4. The method of claim 1, wherein the support is one or more selected from the group consisting of alumina, polyimide, silica, glass, gamma alumina, mullite, zirconia, titania, yttria, ceria, vanadia, silicone, stainless steel and carbon.

5. The method of claim 1, wherein the molar ratio of Si to Al is 50, and the hydrothermal synthesis is conducted at 175° C.

\* \* \* \* \*